United States Patent
Crandall et al.

(10) Patent No.: US 11,630,559 B2
(45) Date of Patent: Apr. 18, 2023

(54) USER INTERFACES FOR MANAGING WEATHER INFORMATION

(71) Applicant: Apple Inc., Cupertino, CA (US)

(72) Inventors: Caroline J. Crandall, Woodside, CA (US); Dylan O. Boelte, Fairfax, CA (US); Wyatt R. Mitchell, San Francisco, CA (US); Ian V. Bambao, Pittsburg, CA (US); Benjamin T. Christie, Santa Barbara, CA (US); Anton M. Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/476,286

(22) Filed: Sep. 15, 2021

(65) Prior Publication Data
US 2022/0391070 A1 Dec. 8, 2022

Related U.S. Application Data

(60) Provisional application No. 63/197,455, filed on Jun. 6, 2021.

(51) Int. Cl.
 *G06F 3/04842* (2022.01)
 *G06F 3/04883* (2022.01)
 *G01W 1/00* (2006.01)

(52) U.S. Cl.
 CPC .......... *G06F 3/04842* (2013.01); *G01W 1/00* (2013.01); *G06F 3/04883* (2013.01)

(58) Field of Classification Search
 CPC ... G06F 3/04842; G06F 3/04883; G01W 1/00
 See application file for complete search history.

(56) References Cited

U.S. PATENT DOCUMENTS

| | | |
|---|---|---|
| 5,500,835 A | 3/1996 | Born |
| 6,297,795 B1 | 10/2001 | Kato et al. |
| 6,359,839 B1 | 3/2002 | Schenk et al. |
| 6,496,780 B1 | 12/2002 | Harris et al. |
| 6,556,222 B1 | 4/2003 | Narayanaswami |
| 6,809,724 B1 | 10/2004 | Shiraishi et al. |
| 7,479,949 B2 | 1/2009 | Jobs et al. |
| 7,971,153 B2 * | 6/2011 | Satoh .............. G01W 1/02 340/995.14 |
| 9,753,436 B2 | 9/2017 | Ely et al. |

(Continued)

FOREIGN PATENT DOCUMENTS

| | | |
|---|---|---|
| EP | 1674889 A1 | 6/2006 |
| EP | 2204702 A1 | 7/2010 |

(Continued)

OTHER PUBLICATIONS

Applicant-Initiated Interview Summary received for U.S. Appl. No. 16/659,507, dated Nov. 17, 2020, 3 pages.

(Continued)

*Primary Examiner* — Jennifer N Welch
*Assistant Examiner* — Ashley M Fortino
(74) *Attorney, Agent, or Firm* — DLA Piper LLP (US)

(57) ABSTRACT

The present disclosure generally relates to managing weather information. In some embodiments, methods and user interfaces for managing weather information are described. In some embodiments, methods and user interfaces for displaying daily weather information are described.

42 Claims, 19 Drawing Sheets

(56) References Cited

U.S. PATENT DOCUMENTS

| | | |
|---|---|---|
| 2003/0107603 A1 | 6/2003 | Clapper |
| 2004/0218472 A1 | 11/2004 | Narayanaswami et al. |
| 2005/0094492 A1 | 5/2005 | Rosevear et al. |
| 2006/0035628 A1 | 2/2006 | Miller et al. |
| 2006/0123362 A1 | 6/2006 | Keely |
| 2007/0211042 A1 | 9/2007 | Kim et al. |
| 2007/0236475 A1 | 10/2007 | Wherry |
| 2008/0082930 A1 | 4/2008 | Omernick et al. |
| 2008/0201647 A1 | 8/2008 | Lagerstedt et al. |
| 2008/0215240 A1 | 9/2008 | Howard et al. |
| 2009/0059730 A1 | 3/2009 | Lyons et al. |
| 2010/0217657 A1 | 8/2010 | Gazdzinski et al. |
| 2011/0022294 A1 | 1/2011 | Apley |
| 2011/0076992 A1* | 3/2011 | Chou .................. G06Q 10/00 455/414.1 |
| 2011/0078624 A1 | 3/2011 | Missig et al. |
| 2011/0157046 A1 | 6/2011 | Lee et al. |
| 2011/0179372 A1 | 7/2011 | Moore et al. |
| 2011/0193878 A1 | 8/2011 | Seo et al. |
| 2011/0202883 A1 | 8/2011 | Oh et al. |
| 2013/0254705 A1 | 9/2013 | Mooring et al. |
| 2014/0136089 A1* | 5/2014 | Hranac .............. G08G 1/09675 701/118 |
| 2014/0229752 A1 | 8/2014 | Lee et al. |
| 2014/0258935 A1 | 9/2014 | Nishida et al. |
| 2014/0317543 A1 | 10/2014 | Kim |
| 2015/0071043 A1 | 3/2015 | Kubota |
| 2015/0128078 A1 | 5/2015 | Oh et al. |
| 2015/0160856 A1 | 6/2015 | Jang et al. |
| 2016/0048283 A1* | 2/2016 | Yang .................. G06F 3/0485 715/784 |
| 2016/0098137 A1 | 4/2016 | Kim et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2017/0300013 A1 | 10/2017 | Satou et al. |
| 2018/0329587 A1* | 11/2018 | Ko ...................... G06Q 10/1093 |
| 2019/0033278 A1* | 1/2019 | Mou .................... G08B 21/12 |
| 2020/0050332 A1 | 2/2020 | Yang et al. |
| 2020/0249632 A1 | 8/2020 | Olwal et al. |
| 2021/0294438 A1 | 9/2021 | Yang et al. |

FOREIGN PATENT DOCUMENTS

| | | |
|---|---|---|
| TW | 200850058 A | 12/2008 |
| TW | 201232486 A1 | 8/2012 |

OTHER PUBLICATIONS

Barbosa Jonathan, "Weather Clock 2.1 for Android", APKPure, Online Available at: https://apkpure.com/weather-clock/com.urbandroid.wclock, Oct. 15, 2015, 3 pages.

Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.

Final Office Action received for U.S. Appl. No. 14/821,667, dated Apr. 26, 2018, 13 pages.

International Preliminary Report on Patentability received for PCT Patent Application No. PCT/US2015/044473, dated Mar. 2, 2017, 20 pages.

International Preliminary Report on Patentability received for PCT Patent Application No. PCT/US2015/044485, dated Mar. 2, 2017, 20 pages.

International Search Report and Written Opinion received for PCT Patent Application No. PCT/US2015/044473, dated Feb. 12, 2016, 24 pages.

International Search Report and Written Opinion received for PCT Patent Application No. PCT/US2015/044485, dated Feb. 9, 2016, 27 pages.

Invitation to Pay Additional Fees received for PCT Patent Application No. PCT/US2015/044473, dated Nov. 3, 2015, Nov. 3, 2015, 5 pages.

Invitation to Pay Additional Fees received for PCT Patent Application No. PCT/US2015/044485, dated Nov. 3, 2015, Nov. 3, 2015, 7 pages.

Non-Final Office Action received for U.S. Appl. No. 14/821,667, dated Feb. 4, 2019, 13 pages.

Non-Final Office Action received for U.S. Appl. No. 14/821,667, dated Jul. 14, 2017, 12 pages.

Non-Final Office Action received for U.S. Appl. No. 16/659,507, dated Oct. 7, 2020, 16 pages.

Notice of Allowance received for U.S. Appl. No. 14/821,667, dated Jun. 12, 2019, 9 pages.

Notice of Allowance received for U.S. Appl. No. 16/659,507, dated Feb. 24, 2021, 7 pages.

Office Action received for Taiwanese Patent Application No. 104126627, dated Nov. 29, 2016, 9 pages (4 pages of English Translation and 5 pages of Official Copy).

Office Action received for Taiwanese Patent Application No. 104126627, dated Aug. 30, 2018, 22 pages (9 pages of English Translation and 13 pages of Official Copy).

Office Action received for Taiwanese Patent Application No. 104126627, dated Dec. 20, 2018, 4 pages (2 pages of English Translation and 2 pages of Official Copy).

Office Action received for Taiwanese Patent Application No. 104126627, dated Oct. 16, 2017, 7 pages (3 pages of English Translation and 4 pages of Official Copy).

Notice of Allowance received for U.S. Appl. No. 17/341,839, dated Oct. 5, 2022, 5 pages.

Corrected Notice of Allowance received for U.S. Appl. No. 17/341,839, dated Oct. 26, 2022, 2 pages.

Notice of Allowance received for U.S. Appl. No. 17/341,839, dated Dec. 2, 2022, 6 pages.

Applicant-Initiated Interview Summary received for U.S. Appl. No. 17/341,839, dated Apr. 29, 2022, 2 pages.

Applicant-Initiated Interview Summary received for U.S. Appl. No. 17/341,839, dated Sep. 16, 2022, 2 pages.

Final Office Action received for U.S. Appl. No. 17/341,839, dated Jul. 18, 2022, 15 pages.

Non-Final Office Action received for U.S. Appl. No. 17/341,839, dated Mar. 17, 2022, 14 pages.

* cited by examiner

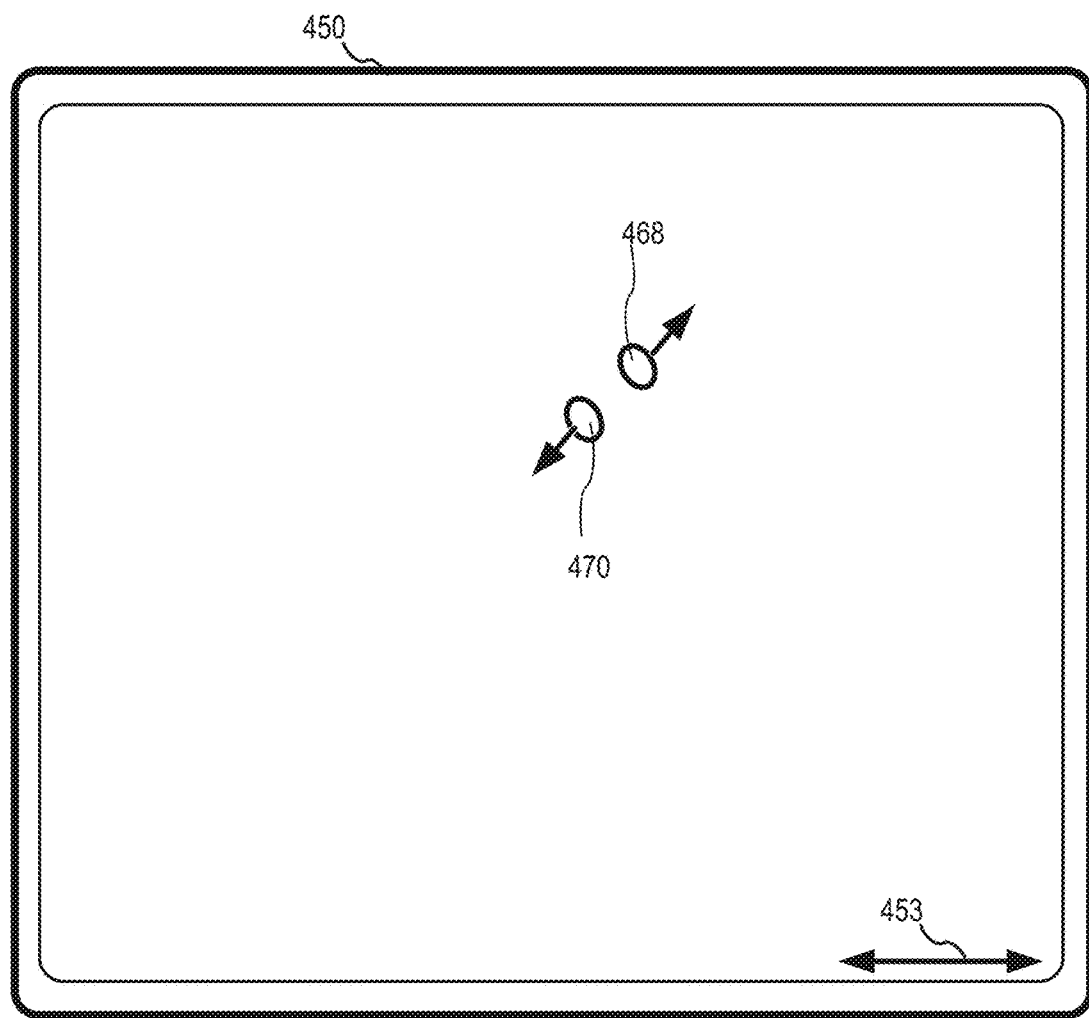
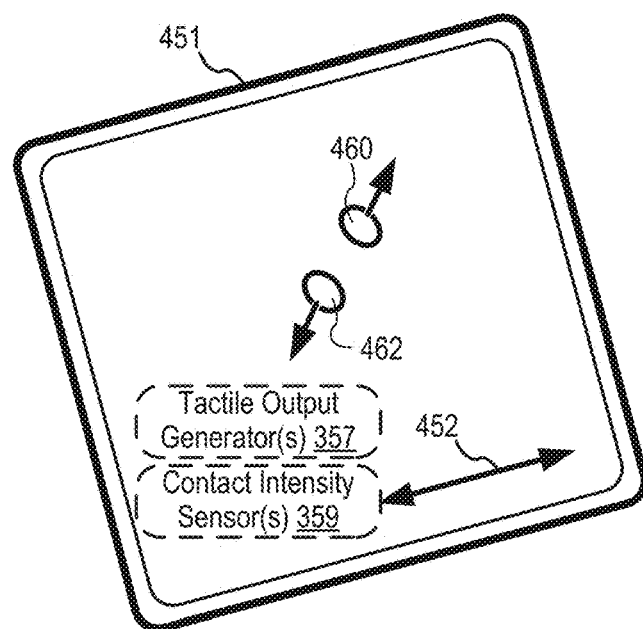
*FIG. 4B*

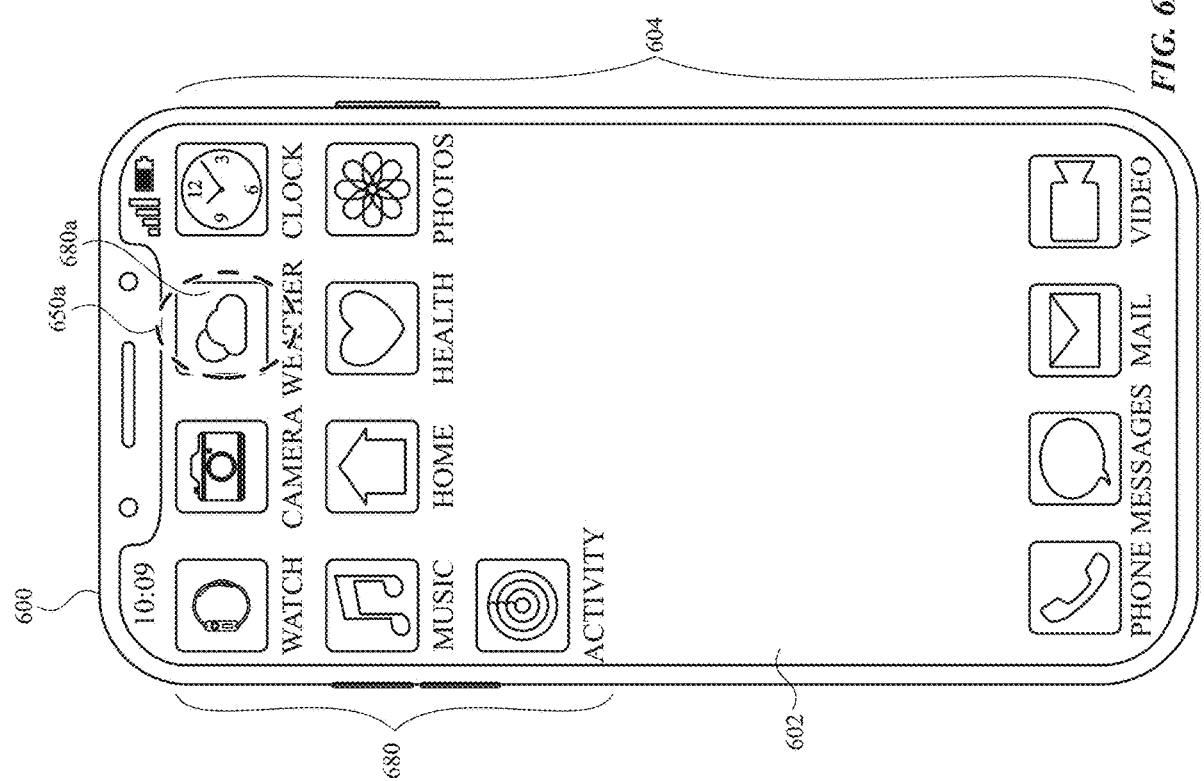

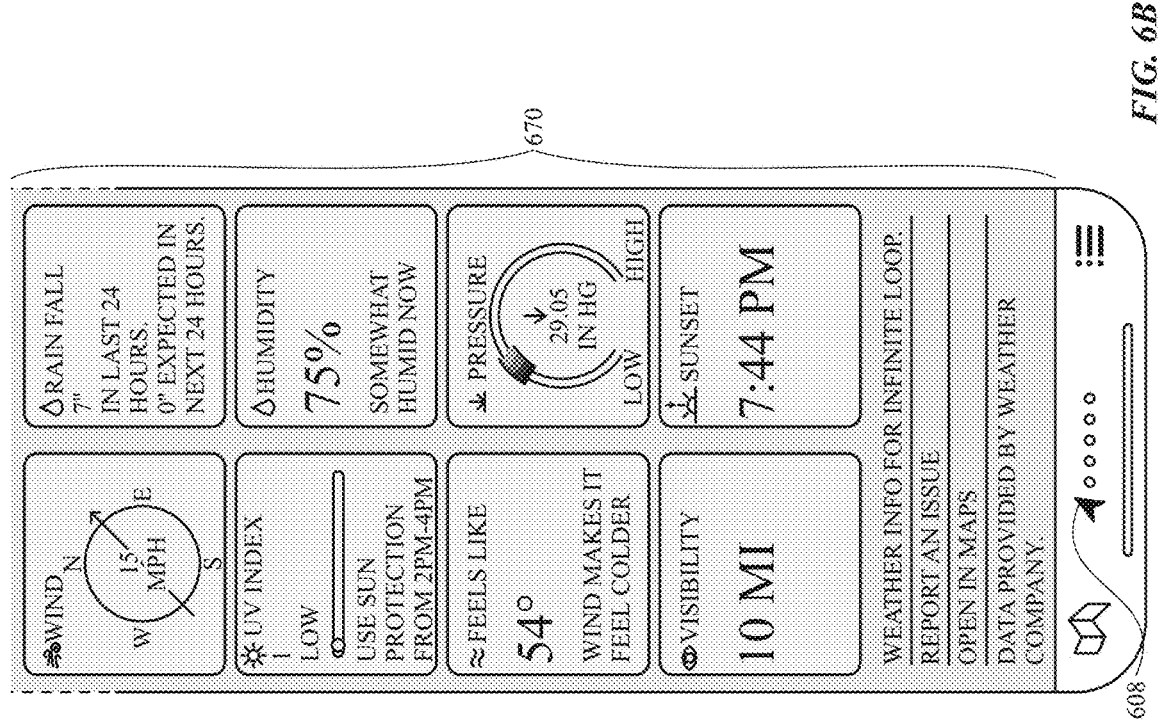
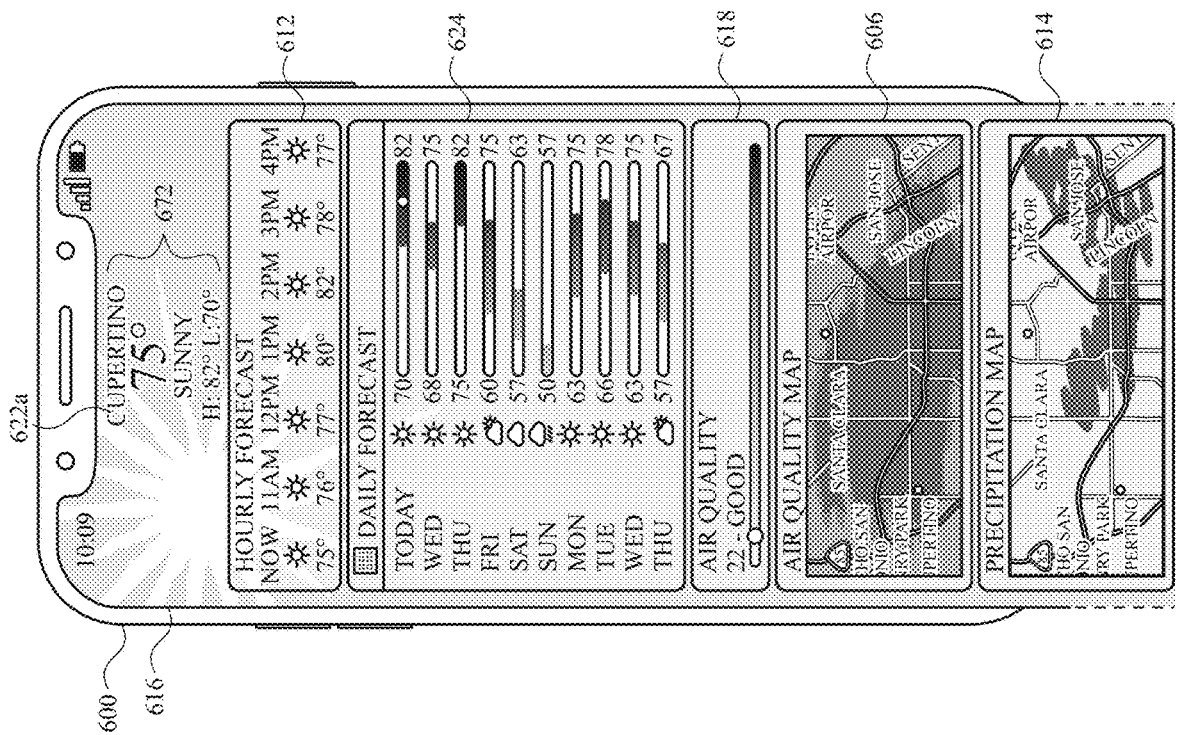
FIG. 6B

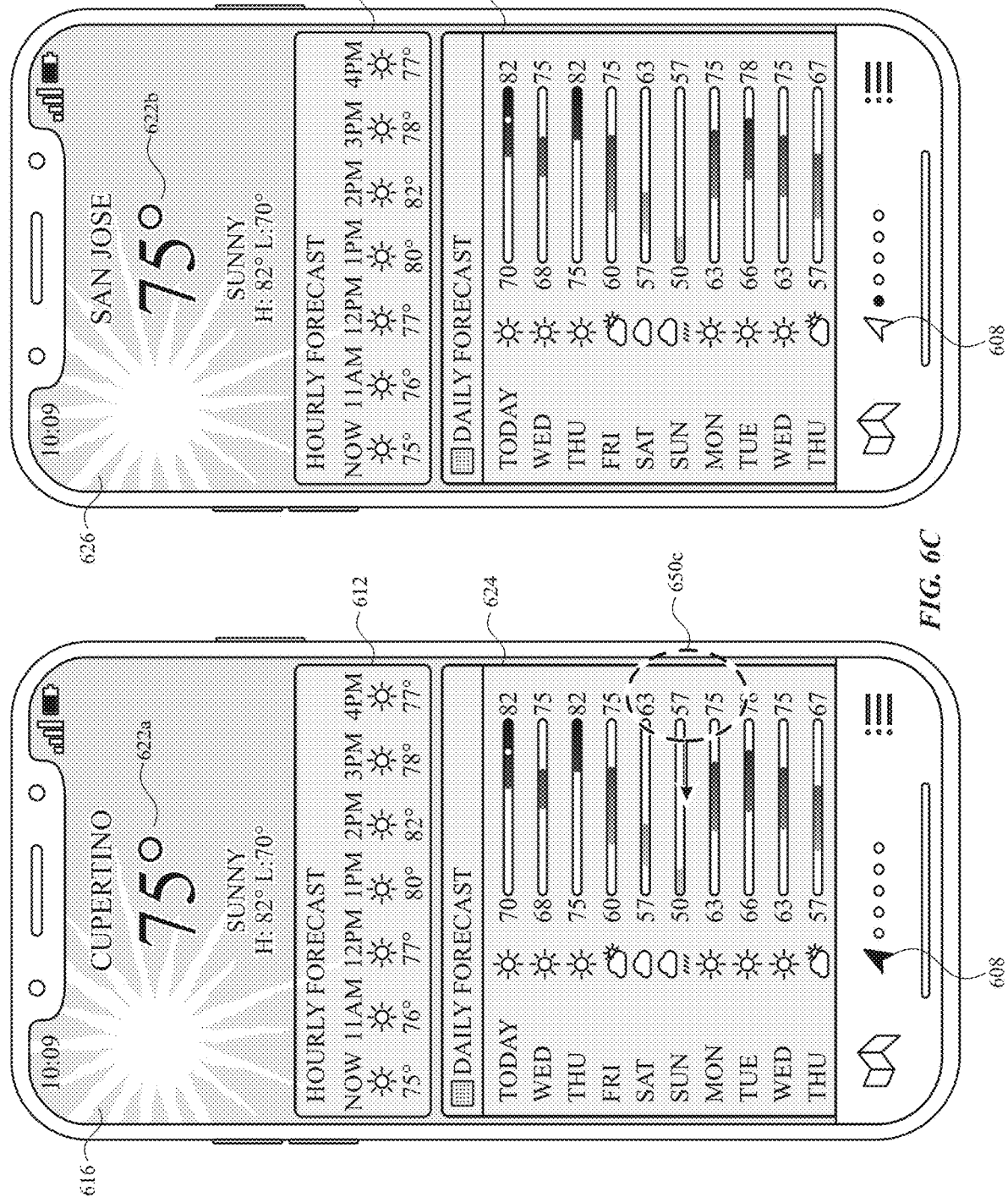

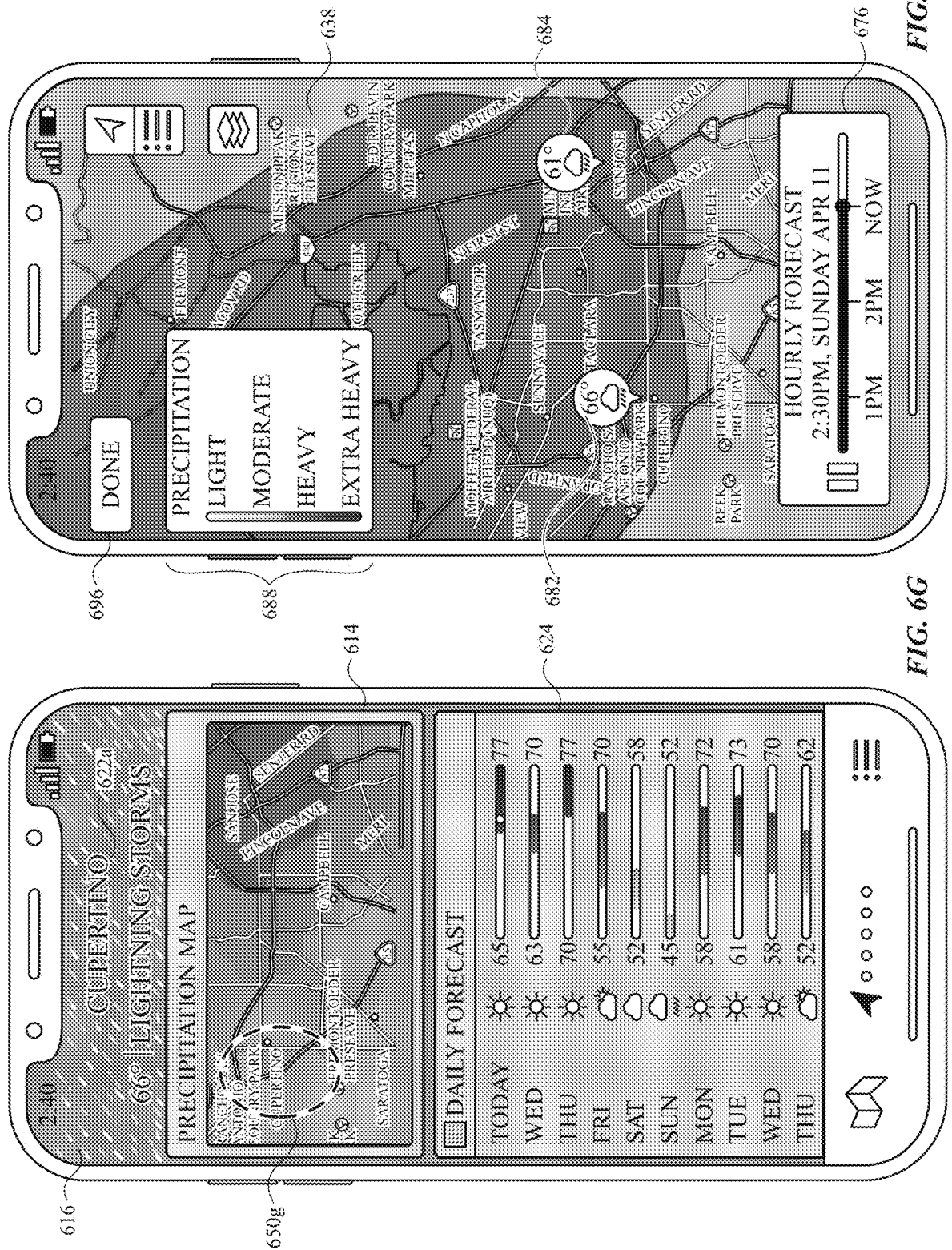

700 ⇾

702
Display, via a display generation component, a weather user interface, wherein displaying the weather user interface includes:

704
In accordance with a determination that one or more weather conditions associated with a location satisfies a first set of weather condition criteria, displaying a first user interface object of a first type.

706
In accordance with a determination that the one or more weather conditions associated with the location do not satisfy the first set of weather condition criteria, forgo displaying the first user interface object.

708
Displaying a second user interface object and a third user interface object wherein:

710
In accordance with a determination that the one or more weather conditions associated with the location satisfy a second set of weather condition criteria, the second user interface object and the third user interface object are displayed in a first order.

712
In accordance with a determination that the one or more weather conditions associated with the location satisfy a third set of weather condition criteria, different from the second set of weather condition criteria, the second user interface object and the third user interface object are displayed in a second order, different from the first order.

902
Display, via the display generation component, a weather user interface that corresponds to a first cumulative period of time that includes a plurality of sub-periods of time, wherein the weather user interface includes:

904
A first user interface object that corresponds to a first sub-period of time of the plurality of sub-periods of time, wherein the first user interface object includes:

906
A first cumulative time period indication that indicates a range of a weather value over the first cumulative period of time.

908
A first sub-period indication that represents a range of the weather value for the first sub-period of time.

910
A second user interface object that corresponds to a second sub-period of time of the plurality of sub-periods of time and that is different than the first sub-period of time, wherein the second user interface object includes:

912
A second cumulative time period indication that indicates the range of the weather value over the first cumulative period of time.

914
A second sub-period indication that represents a range of the weather value for the second sub-period of time.

*FIG. 9*

USER INTERFACES FOR MANAGING WEATHER INFORMATION

CROSS-REFERENCE TO RELATED APPLICATION

This application claims priority to U.S. Provisional Patent Application No. 63/197,455, entitled "USER INTERFACES FOR MANAGING WEATHER INFORMATION," filed on Jun. 6, 2021, the contents of which is hereby incorporated by reference in its entirety.

FIELD

The present disclosure relates generally to computer user interfaces, and more specifically to techniques for managing weather information.

BACKGROUND

Smartphones and other personal electronic devices allow users to view current and forecasted weather conditions at various locations. Users may view information related to a variety of weather metrics such as temperature values and precipitation values for the various locations.

BRIEF SUMMARY

Some techniques for managing weather information using computer, however, are generally cumbersome and inefficient. For example, some existing techniques use a complex and time-consuming user interface, which may include multiple key presses or keystrokes to view the most relevant weather information for a location. Existing techniques require more time than necessary, wasting user time and device energy. This latter consideration is particularly important in battery-operated devices.

Accordingly, the present technique provides computer systems with faster, more efficient methods and interfaces for managing weather information. Such methods and interfaces optionally complement or replace other methods for managing weather information. Such methods and interfaces reduce the cognitive burden on a user and produce a more efficient human-machine interface. For battery-operated computing devices, such methods and interfaces reduce processing power which results in the conservation of power and an increase the time between battery charges.

In accordance with some embodiments, a method is described. The method is performed at a computer system that is in communication with a display generation component. The method comprises displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments a non-transitory computer readable storage is described. The non-transitory computer-readable storage medium stores one or more programs configured to be executed by one or more processors of a computer system, wherein the computer system is in communication with a display generation component, the one or more programs including instructions for: displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments a transitory computer readable storage is described. The transitory computer-readable storage medium stores one or more programs configured to be executed by one or more processors of a computer system, wherein the computer system is in communication with a display generation component, the one or more programs including instructions for: displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments, a computer system is described. The computer system comprises one or more processors, wherein the computer system is configured to communicate with a display generation component; and memory storing one or more programs configured to be executed by the one or more processors, the one or more programs including instructions for: displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments, a computer system is described. The computer system is configured to communicate with a display generation component. The computer system comprises: means for displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments, a computer program product is described. The computer program product comprises one or more programs configured to be executed by one or more processors of a computer system that is in communication with a display generation component, the one or more programs including instructions for: displaying, via the display generation component, a weather user interface, wherein displaying the weather user interface includes: in accordance with a determination that one or more weather conditions associated with a location satisfies a first set of weather condition criteria, displaying a first user interface object of a first type; and in accordance with a determination that the one or more weather conditions associated with the location do not satisfy the first set of weather condition criteria, forgo displaying the first user interface object; and displaying a second user interface object and a third user interface object of a second type, wherein: in accordance with a determination that the one or more weather conditions associated with the location satisfy a second set of weather condition criteria, the second user interface object and the third user interface object are displayed in a first order; and in accordance with a determination that the one or more weather conditions associated with the location satisfy a third set of weather condition criteria, different from the second set of weather condition criteria, the second user interface object and the third user interface object are displayed in a second order, different from the first order.

In accordance with some embodiments, a method is described. The method is performed at a computer system that is in communication with a display generation component. The method comprises: displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

In accordance with some embodiments a non-transitory computer readable storage is described. The non-transitory computer-readable storage medium stores one or more programs configured to be executed by one or more processors of a computer system, wherein the computer system is in communication with a display generation component, the one or more programs including instructions for: displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface object that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

In accordance with some embodiments a transitory computer readable storage is described. The transitory computer-readable storage medium stores one or more programs configured to be executed by one or more processors of a computer system, wherein the computer system is in communication with a display generation component, the one or more programs including instructions for: displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface object that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

In accordance with some embodiments, a computer system is described. The computer system comprises one or more processors, wherein the computer system is configured to communicate with a display generation component; and memory storing one or more programs configured to be executed by the one or more processors, the one or more programs including instructions for: displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface object that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

In accordance with some embodiments, a computer system is described. The computer system is configured to communicate with a display generation component. The computer system comprises means for displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface object that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

In accordance with some embodiments, a computer program product is described. The computer program product comprises one or more programs configured to be executed by one or more processors of a computer system that is in communication with a display generation component, the one or more programs including instructions for: displaying, via the display generation component, a weather user interface that corresponds to a first cumulative period of time that includes a plurality of sub-periods of time, wherein the weather user interface includes: a first user interface object that corresponds to a first sub-period of time of the plurality of sub-periods of time, wherein the first user interface object includes: a first cumulative time period indication that indicates a range of a weather value over the first cumulative period of time; and a first sub-period indication that represents a range of the weather value for the first sub-period of time; and a second user interface object that corresponds to a second sub-period of time of the plurality of sub-periods of time and that is different than the first sub-period of time, wherein the second user interface object includes: a second cumulative time period indication that indicates the range of the weather value over the first cumulative period of time; and a second sub-period indication that represents a range of the weather value for the second sub-period of time.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing weather information, thereby increasing the effectiveness, efficiency, and user satisfaction with such devices. Such methods and interfaces may complement or replace other methods for managing weather information.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6I illustrate exemplary user interfaces for managing weather information.

FIG. 7 is a flow diagram illustrating a method for managing weather information.

FIG. 9 is a flow diagram illustrating a method for displaying daily weather information.

DESCRIPTION OF EMBODIMENTS

Figure 1A:
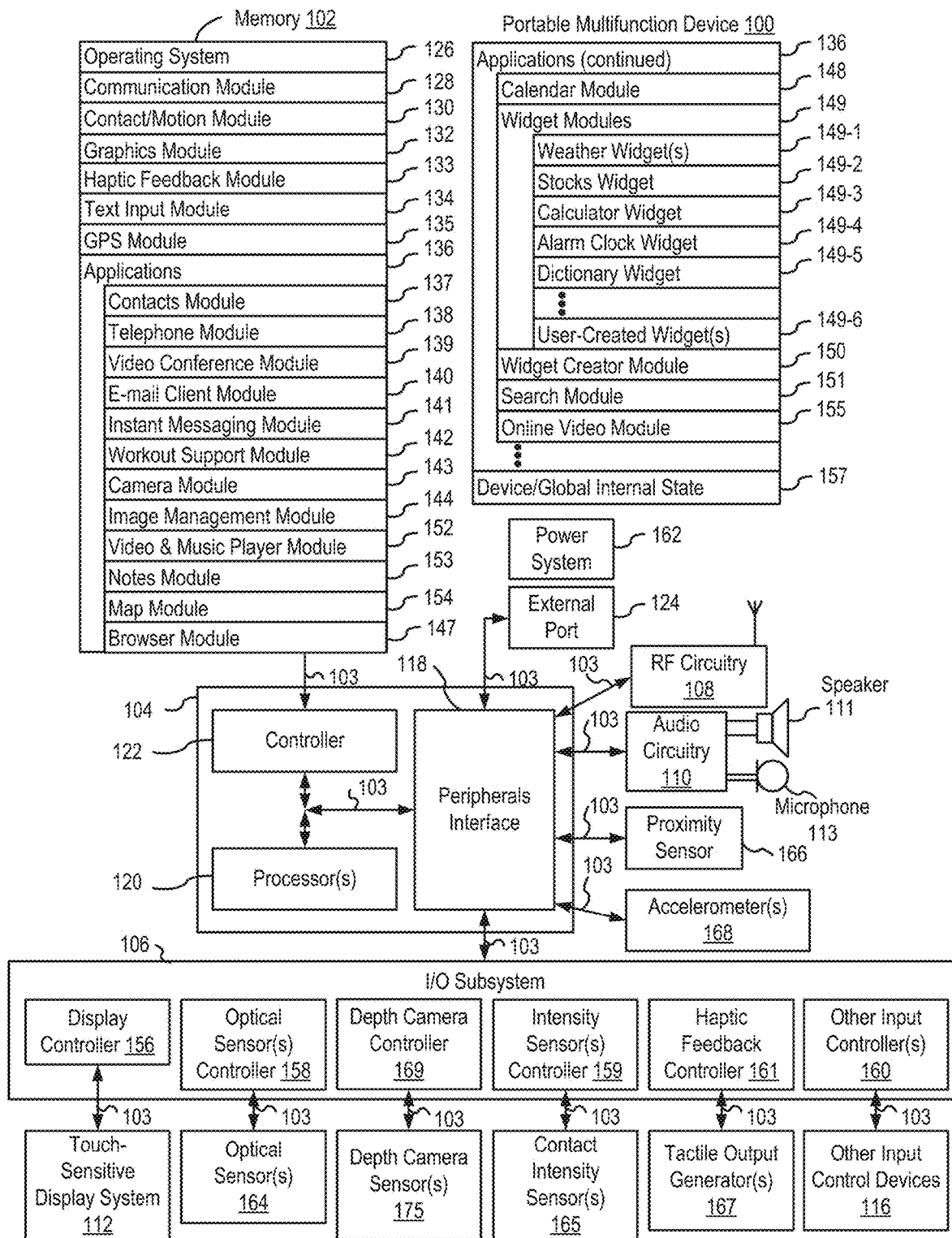
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices and/or computer systems that provide efficient methods and interfaces for managing weather information. For example, there is a need for electronic devices and/or computers systems to allow a user to view various types of real-time weather information where the most important information is readily available for the user. Such techniques can reduce the cognitive burden on a user who manage weather information, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing weather information. FIGS. 6A-6I illustrate exemplary user interfaces for managing weather information. FIG. 7 is a flow diagram illustrating methods of managing weather information in accordance with some embodiments. The user interfaces in FIGS. 6A-6I are used to illustrate the processes described below, including the processes in FIG. 7. FIGS. 8A-8E illustrate exemplary user interfaces for displaying daily weather information. FIG. 9 is a flow diagram illustrating methods of displaying daily weather information in accordance with some embodiments. The user interfaces in FIGS. 8A-8E are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
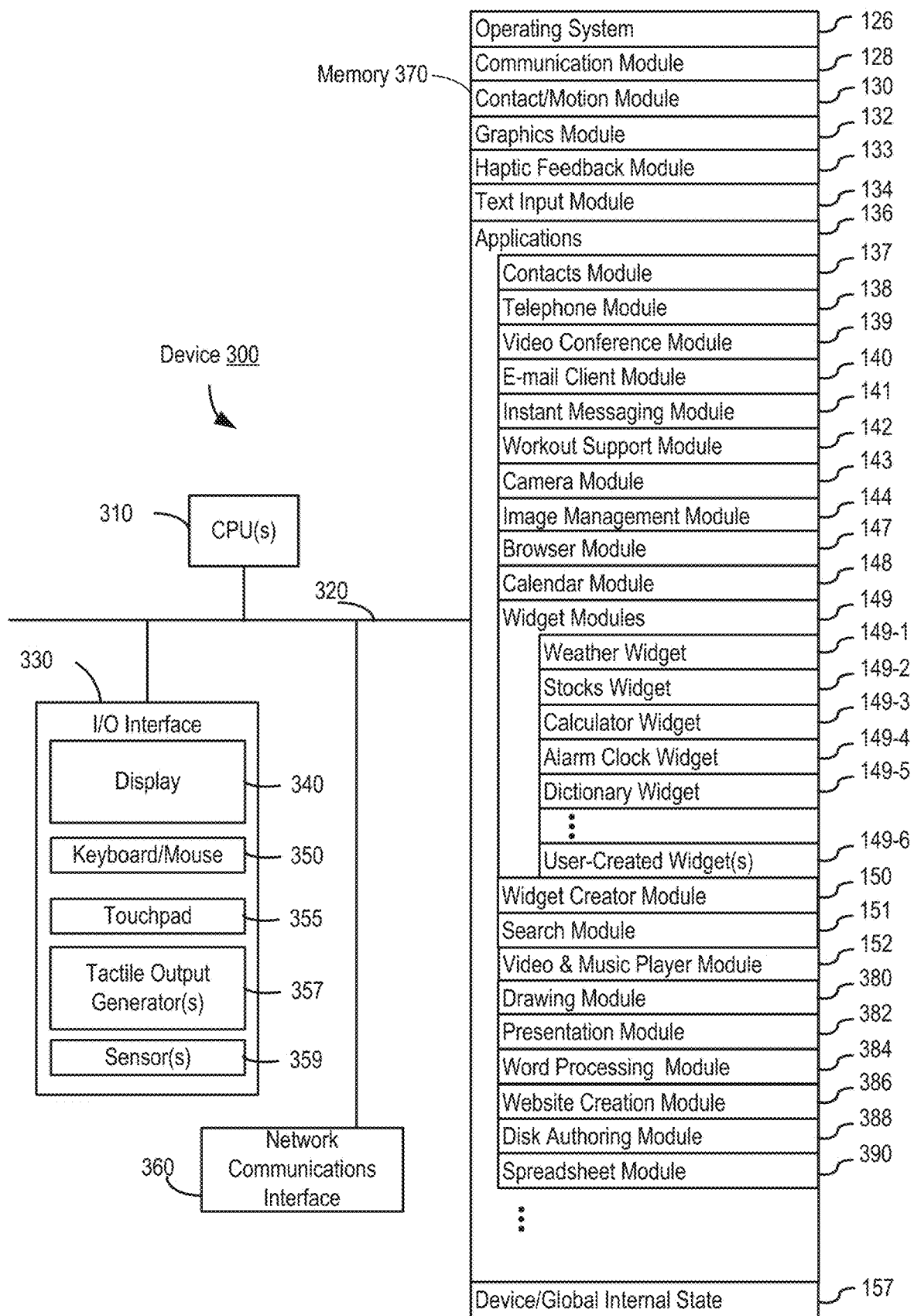
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
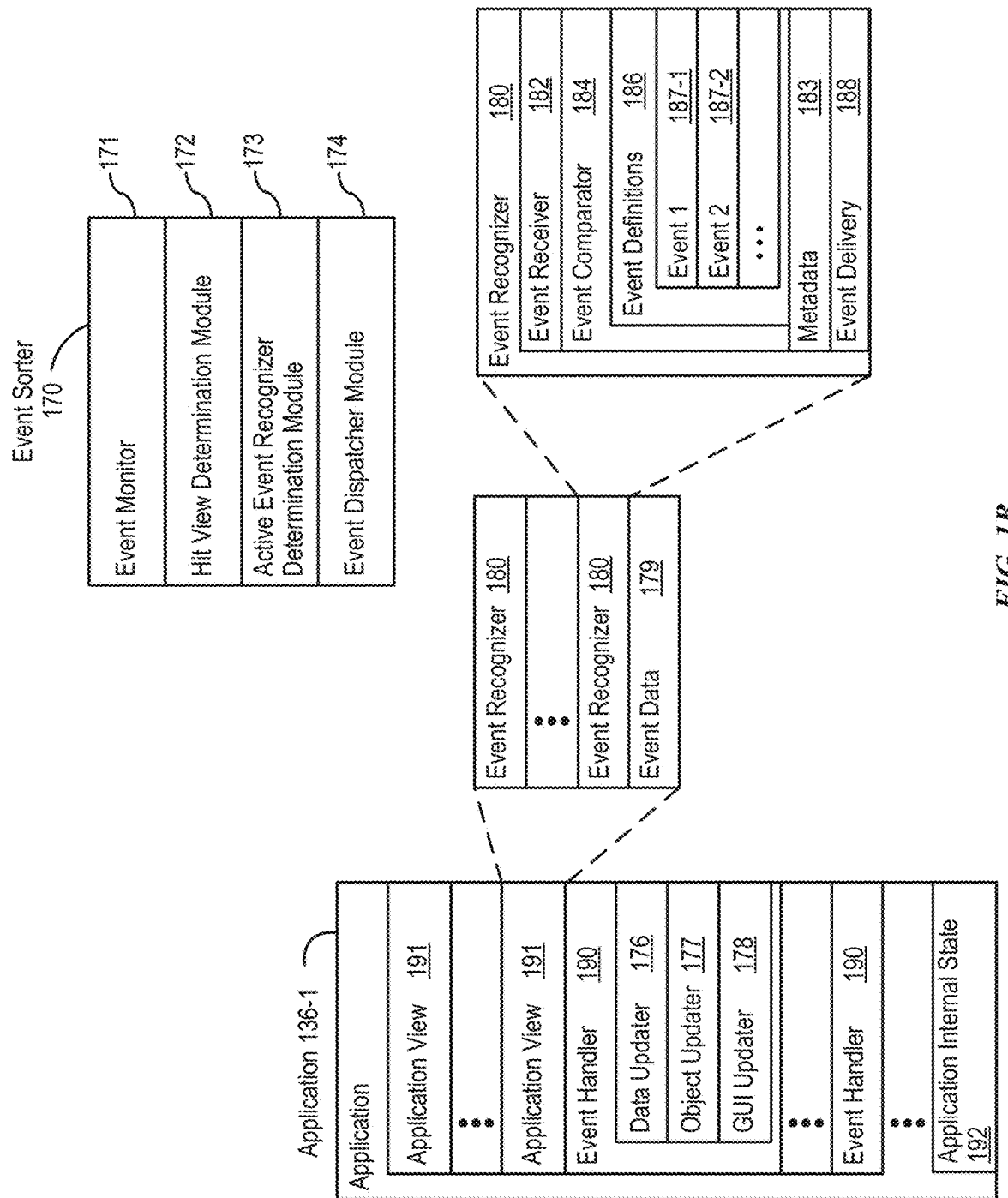
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
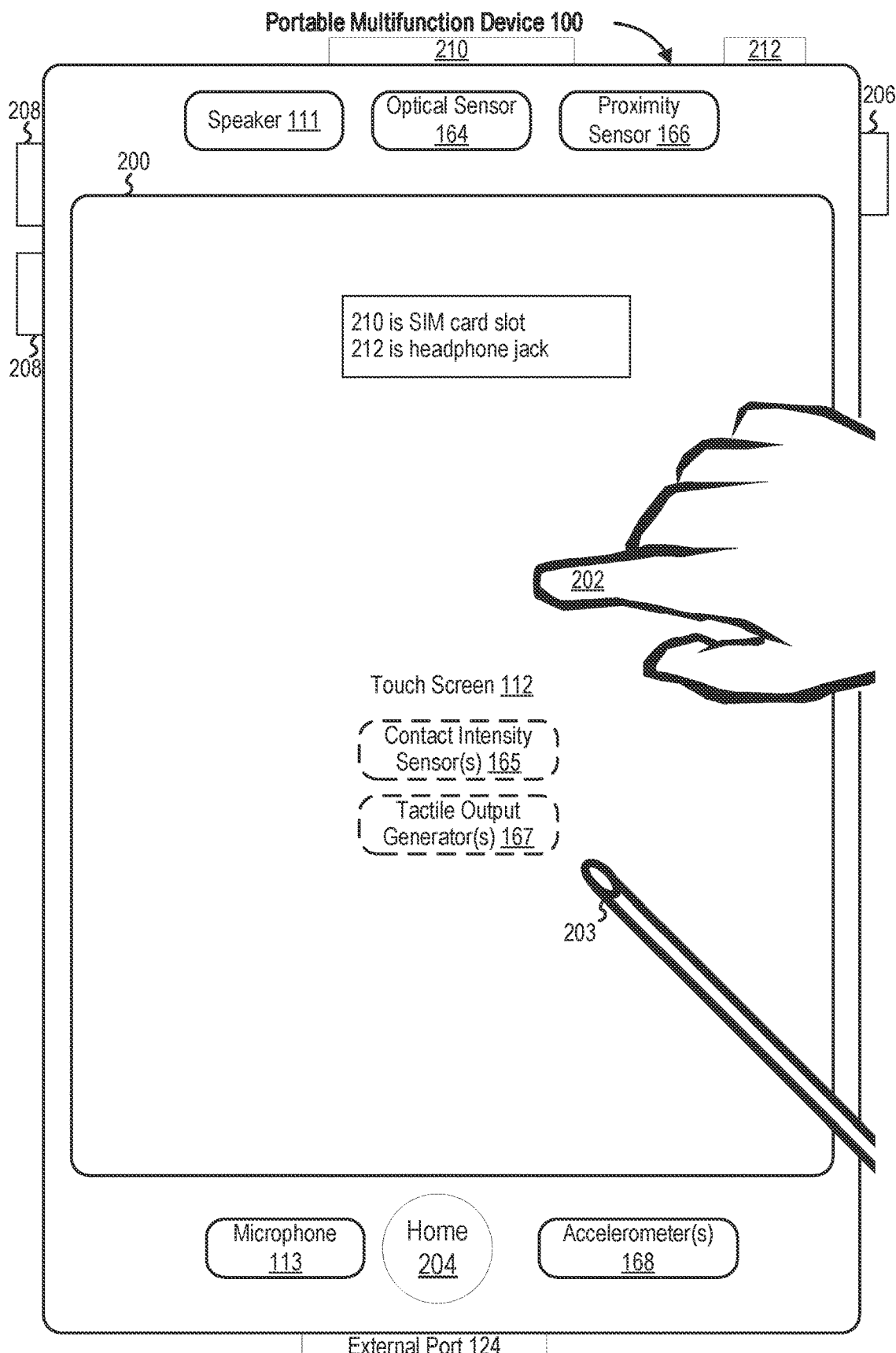
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
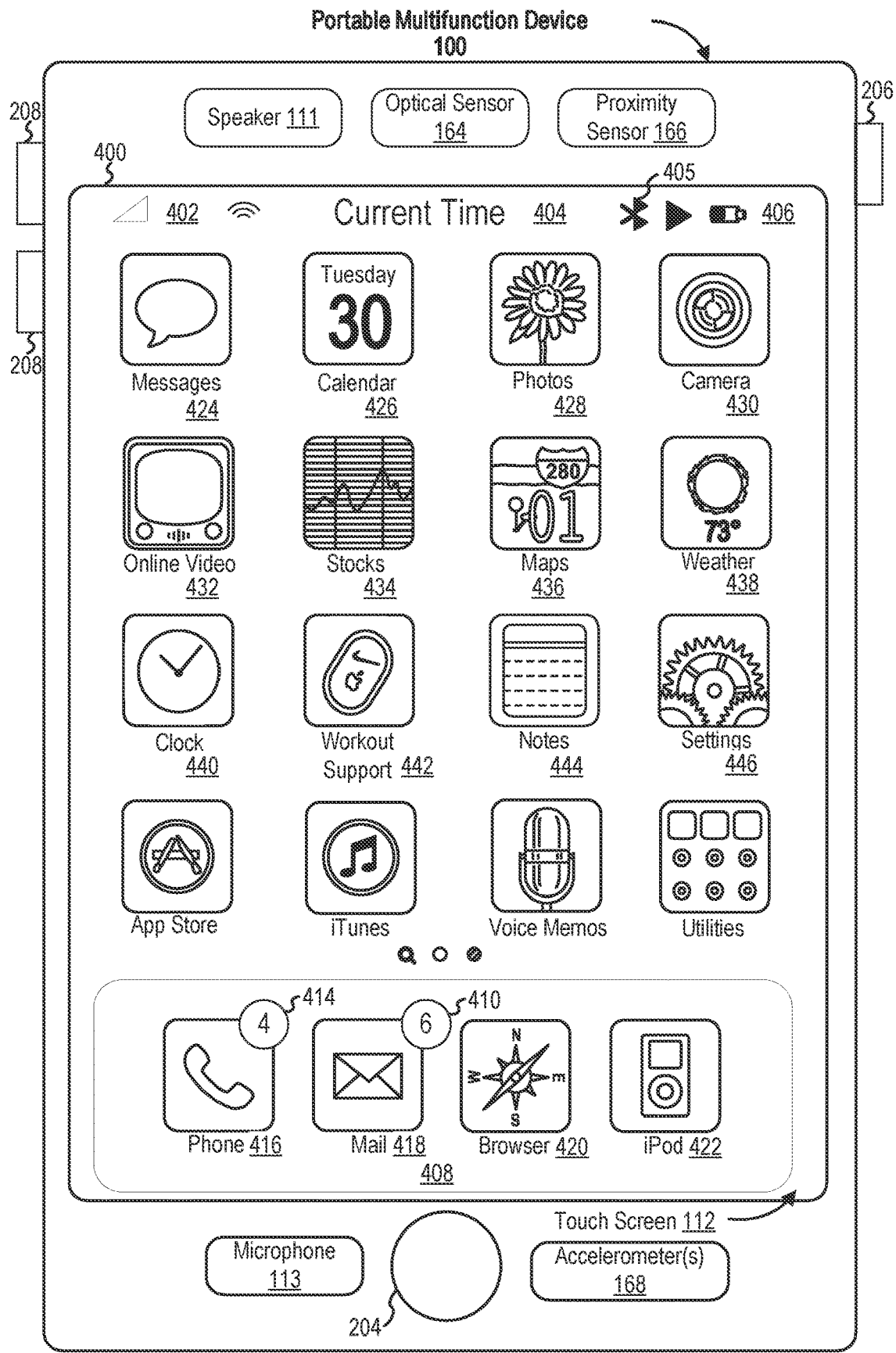
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
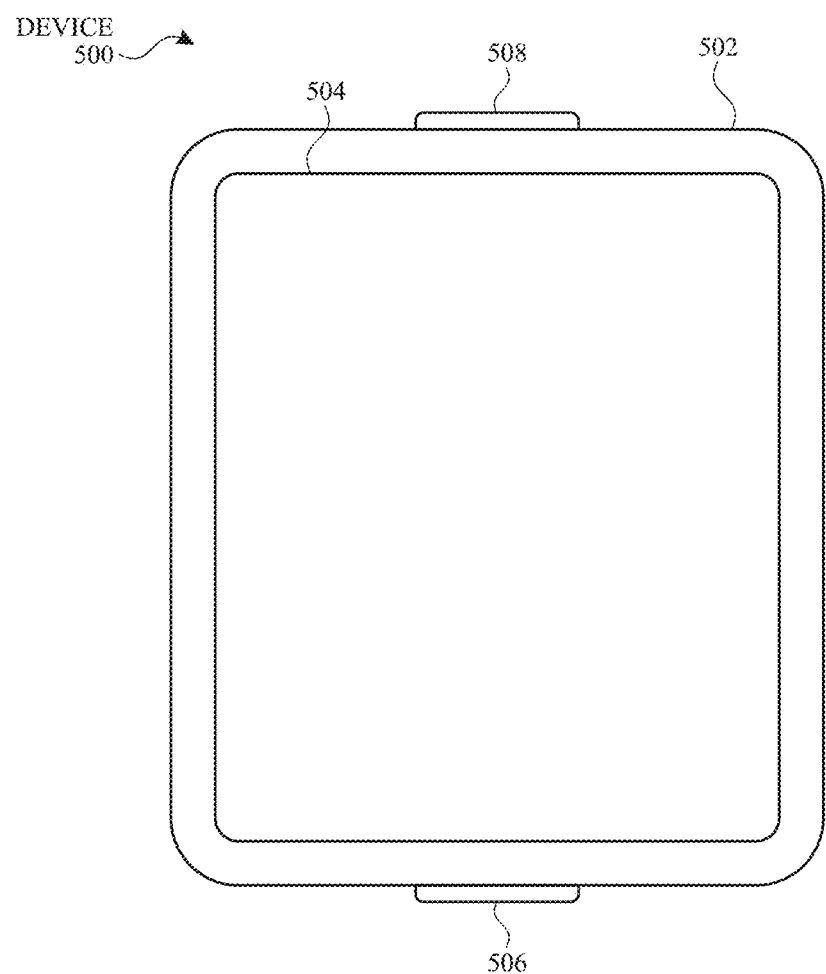
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
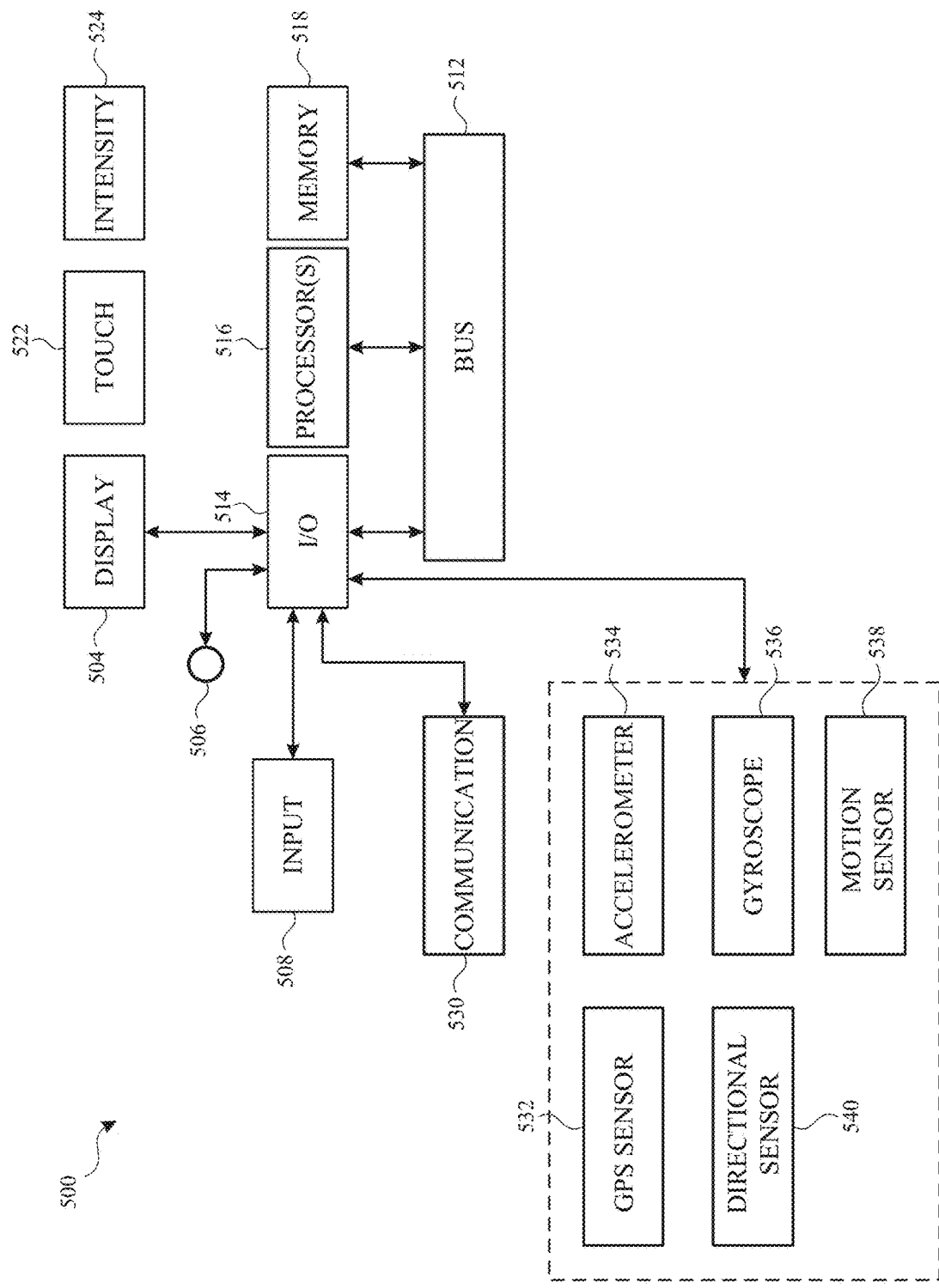
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6I illustrate exemplary user interfaces for managing weather information, in accordance with some embodiments. The user interfaces in these figures are used to illustrate the processes described below, including the processes in FIG. 7.

FIG. 6A illustrates computer system 600 displaying, on display 602, home screen user interface 604 that includes application icons 680. Each application icon 680 represents a corresponding application. In some embodiments, in response to detecting an input directed to one of the application icons, computer system 600 launches an application that corresponds to the selected application icon. In some embodiments, computer system 600 includes one or more features of devices 100, 300, and/or 500. At FIG. 6A, computer system 600 detects tap gesture 650a on application icon 680a that corresponds to a weather application.

As illustrated in FIG. 6B, in response to detecting tap gesture 650a, computer system 600 displays weather user interface 616. FIG. 6B illustrates the entirety of weather user interface 616. Weather user interface 616 of FIG. 6B corresponds to the morning of a first day at physical location 622a (e.g., Cupertino, Calif.) that is represented by weather user interface 616 (e.g., weather user interface 616 provides weather information for physical location 622a). Weather user interface 616 includes hourly forecast platter 612, daily forecast platter 624, air quality platter 618, air quality map platter 606, precipitation map platter 614, summary region 672, weather information region 670, and location indicator 608. Location indicator 608 is shown as selected (e.g., as indicated by location indicator 608 having a bolded appearance). Because location indicator 608 is selected, physical location 622a corresponds to a physical location of computer system 600 (e.g., Cupertino, Calif.).

As illustrated in FIG. 6B, hourly forecast platter 612 includes indications of current weather conditions and forecasted weather conditions over a period of time (e.g., 5, hours, 6 hours, 7 hours) for physical location 622a. Daily forecast platter 624 includes indications of a range of a weather value (e.g., temperature, humidity, rain) for a period of time (e.g., a week, 10 day period) and a range of the weather value for each sub-period within the period of time (e.g., each day in the week, or 10 day period) at physical location 622a. Air quality platter 618 includes an indication of the current air quality at the physical location 622a.

Air quality map platter 606 includes a map of physical location 622a that indicates air quality conditions at the location. Precipitation map platter 614 includes a map of physical location 622a that indicates the precipitation conditions (e.g., rain conditions, snow conditions, hail conditions) at physical location 622a. Weather information region 670 includes a variety of platters that indicate a variety of different types of weather information (e.g., humidity, UV index, air pressure, visibility, sunset, sunrise, amount of rainfall, wind direction) for physical location 622a. Summary region 672 includes the name (e.g., Cupertino) of physical location 622a and indications of the current weather conditions at physical location 622a.

As illustrated in FIG. 6B, hourly forecast platter 612 is the top platter in weather user interface 616. Daily forecast platter 624 is located directly beneath hourly forecast platter 612 and above each of air quality platter 618, air quality map platter 606, and precipitation map platter 614. In some embodiments, daily forecast platter 624 is the top platter of weather user interface 616 and hourly forecast platter 612 is displayed directly beneath daily forecast platter 624. In some embodiments, hourly forecast platter 612 is displayed between daily forecast platter 624 and each of air quality platter 618, air quality map platter 606, and precipitation map platter 614.

The location of precipitation map platter 614, air quality platter 618, and air quality map platter 606 within weather user interface 616 is dependent upon the weather conditions at physical location 622a. If it is determined that weather conditions at physical location 622a are associated one of air quality platter 618, air quality map platter 606, or precipitation map platter 614, then the corresponding platter will be located in the weather user interface above daily forecast platter 624. In some embodiments, two or more of air quality platter 618, air quality map platter 606, and precipitation map platter 614 will be located above daily forecast platter 624. As illustrated in FIG. 6B, if it is determined that weather conditions at physical location 622a are not specifically associated with one of air quality platter 618 (e.g., if current air quality is hazardously low), air quality map platter 606 (e.g., if current air quality is hazardously low), or precipitation map platter (e.g., if it is currently raining or predicted to rain soon), then each platter will be located beneath daily forecast platter 624.

As illustrated in FIG. 6B, weather user interface 616 includes a dynamic representation (e.g., animation) of the current weather conditions at physical location 622a. Weather user interface 616 includes a representation of the sun in the upper left hand corner to signify that the sun is rising because weather user interface 616 of FIG. 6B is displayed during the morning portion of the current day. As the day progresses, the representation of the sun will move from the left side of weather user interface 616 to the right side of weather user interface 616. That is, the location of the representation of the sun is representative of the real world location of the sun at physical 622a location. In some embodiments, weather user interfaces includes a number of dynamic representations of a number of weather conditions at physical location 622a.

As illustrated in FIG. 6C, computer system 600 displays a portion of weather user interface 616. As a part of displaying the portion of weather user interface 616, computer system 600 concurrently displays hourly forecast platter 612, daily forecast platter 624, and location indicator 608. Computer system 600 displays location indicator 608 as selected because, as discussed above in relation to FIG. 6B, weather user interface 616 corresponds to a current physical location of computer system 600. At FIG. 6C, computer system 600 detects leftward swipe gesture 650c on weather user interface 616.

As illustrated in FIG. 6D, in response to detecting leftward swipe gesture 650c, computer system 600 displays a portion of weather user interface 626. Weather user interface 626 is a different embodiment of weather user interface 616 as described above in relation to FIGS. 6B and 6C. Weather user interface 626 corresponds to physical location 622b (e.g., San Jose, Calif.) that has been selected as a point of interest (e.g., via previous user inputs). Weather user interface 626 includes weather information (e.g., hourly forecast, daily forecast) for physical location 622b.

As illustrated in FIG. 6D, weather user interface 626 includes a dynamic representation of the current weather conditions at physical location 622b. The dynamic representation of weather user interface 626 is the same type of dynamic representation as described above in relation to weather user interface 616 of FIGS. 6B and 6C because both physical locations are experiencing the same type of weather conditions. In some embodiments, the dynamic representation in FIG. 6D will be different from the dynamic representation in FIG. 6B.

As illustrated in FIG. 6D, computer system 600 does not display location indicator 608 as selected (e.g., as indicated by location indicator 608 not being bolded). At FIG. 6D, a determination is made that physical location 622b does not correspond to the physical location of computer system 600. Because a determination is made that physical location 622b does not correspond to the physical location of computer system 600, computer system 600 does not display location indicator 608 as selected.

Figure 6E:
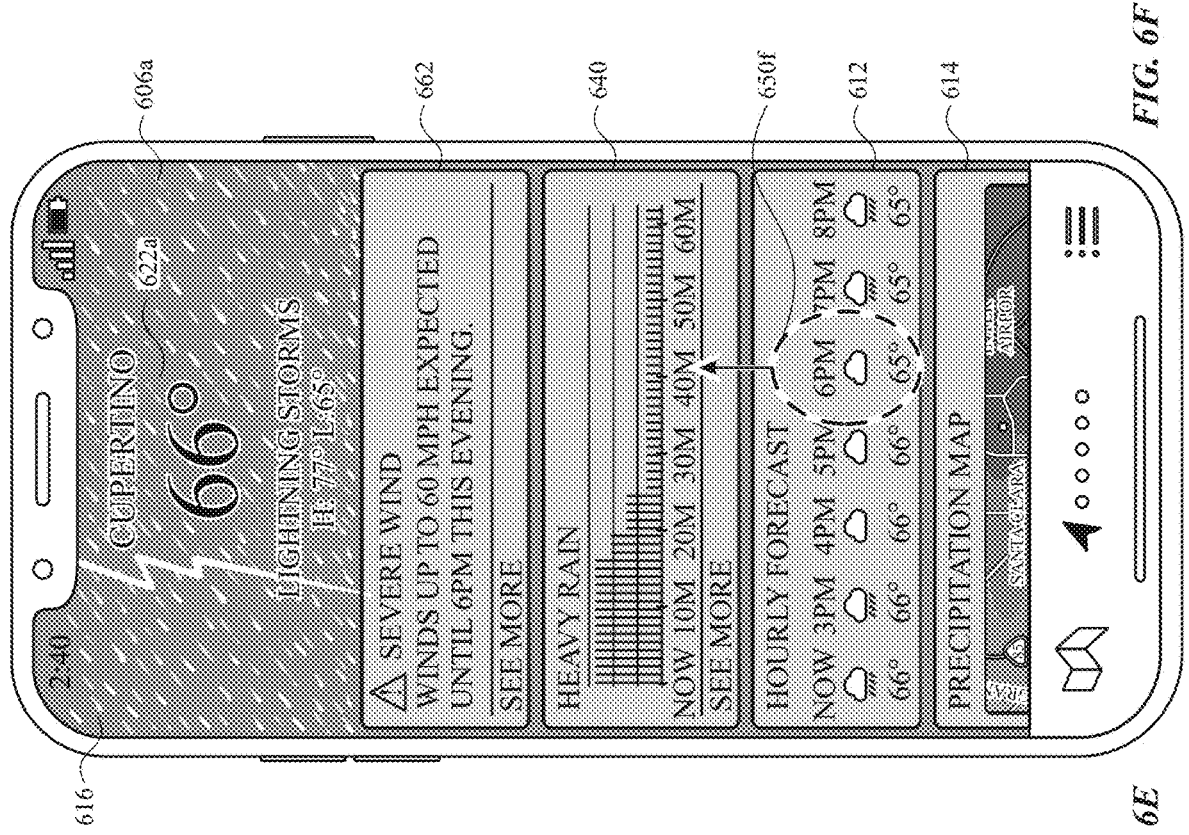

Weather user interface 616 at FIG. 6E includes weather information for a second day (e.g., a day (e.g., a non-sequential day with respect to the first day) that is different than the first day as discussed above in relation to FIG. 6B) for physical location 622a. As illustrated in FIG. 6E, computer system 600 displays a portion of weather user interface 616. At FIG. 6E, a determination is made that there is a lightning storm at physical location 622a. Because a determination is made that there is a lightning storm at physical location 622a, weather user interface 616 includes precipitation platter 640 directly above hourly forecast platter 612. Precipitation platter 640 indicates an amount of precipitation (e.g., rain, snow, hail) that is expected at physical location 622a over a time period (e.g., the next hour).

Precipitation platter 640 is a type of conditional platter that is included in weather user interface 616 if current weather conditions at physical location 622a correspond to precipitation platter 640 (e.g., the rain at physical location 622a corresponds to precipitation platter 640). Various conditional platters are included in weather user interface 616 if weather conditions at physical location 622a correspond to a type of conditional platter. In some embodiments, weather user interface 616 will include two different types of conditional platters (e.g., precipitation platter 640 and severe weather alert 662), where each conditional platter corresponds to a different type of weather condition (e.g., precipitation weather conditions (e.g., snow, hail, rain), severe weather conditions (tornados, hurricanes, tsunami, forest fires, ice storms) associated with physical location 622a. In some embodiments, a conditional platter corresponds to a number of weather conditions. In some embodiments, a conditional platter corresponds to a weather condition that is different from rain (e.g., snow, hail, ice, flooding).

As illustrated in FIG. 6E, weather user interface 616 includes precipitation map platter 614 at a location that is directly beneath hourly forecast platter 612. Weather user interface 616 includes precipitation map platter 614 directly beneath hourly forecast platter 612 because precipitation map platter 614 corresponds to the current weather conditions at physical location 622a. As discussed above in relation to FIG. 6B, weather user interface 616 includes precipitation map platter 614 at a location that is beneath the daily forecast platter (not shown in FIG. 6E) (e.g., as described above in relation to FIG. 6B) if the current weather conditions at physical location 622a do not correspond to the precipitation map platter 614.

As illustrated in FIG. 6E, as a part of displaying weather user interface 616, computer system 600 concurrently displays precipitation platter 640 and precipitation map platter 614. Computer system 600 displays precipitation platter 640 above hourly forecast platter 612. Computer system 600 displays hourly forecast platter 612 between precipitation platter 640 and precipitation map platter 614.

As illustrated in FIG. 6E, computer system 600 displays weather animations that correspond to the weather conditions at physical location 622a. Because a determination is made that that there is a lightning storm at physical location 622a, weather user interface 616 includes an animation of rain droplets and a lightning bolt. The animations of both the rain droplets and the lightning bolt interact with the top platter in weather user interface 616 (e.g., precipitation platter 640 of FIG. 6E). For example, the animation of the rain will land and collect on the top of precipitation platter 640 while the lightning bolt will strike the top of precipitation platter 640. In some embodiments, computer system 600 displays a number of weather animations that correspond to a number of different weather conditions.

Different types of weather animations interact with the top platter of weather user interface 616 differently. In some embodiments, if the weather animation is representative of hail, the weather animation will bounce off of the top of the top platter included in weather user interface 616. In some embodiments, if the weather animation is representative of snow, the weather animation will come to rest upon the top of the top platter included in weather user interface 616.

Figure 6F:
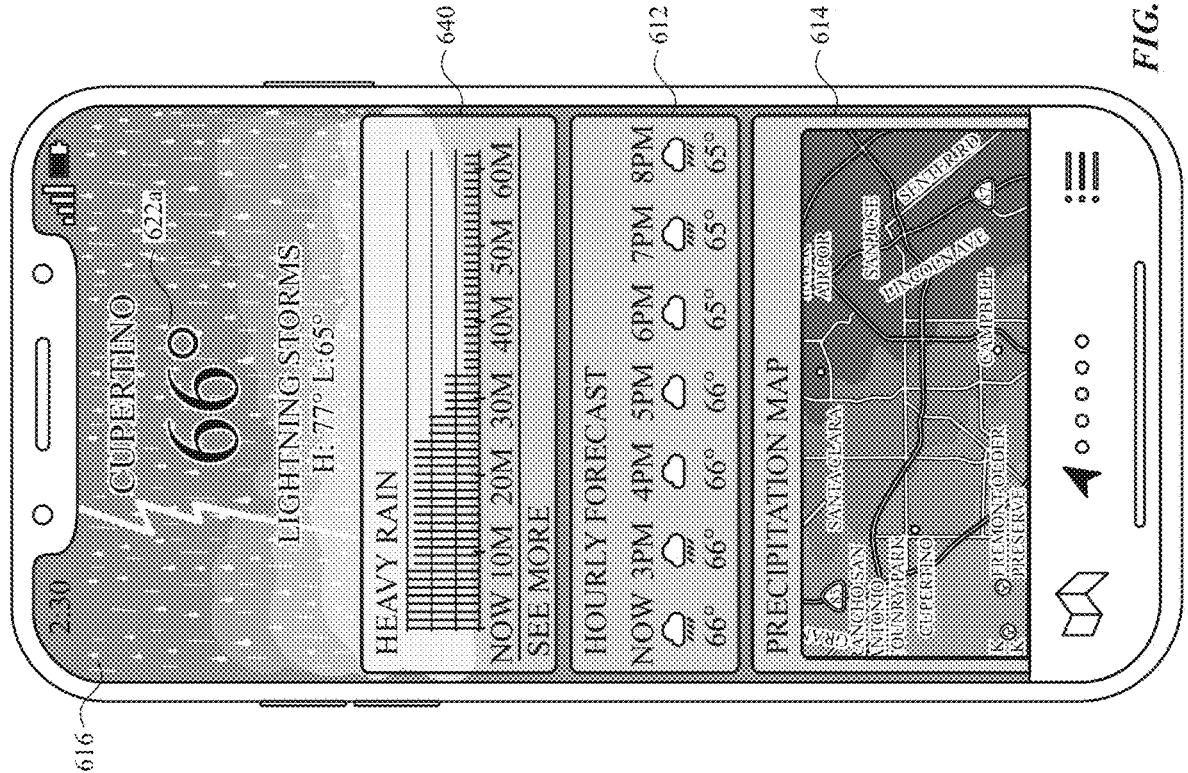

As illustrated in FIG. 6F, computer system 600 displays weather user interface 616 ten minutes after the display of weather user interface 616 as described in relation to FIG. 6E. At FIG. 6F, a determination is made that there are strong winds at physical location 622a. Because a determination is made that there are strong winds at physical location 622a, weather user interface 616 includes severe weather alert platter 662 as the top platter in weather user interface 616. Severe weather alert platter 662 is a type of conditional platter that is only included in weather user interface 616 when there is severe weather at physical location 622a. When severe weather alert platter 662 is included in weather user interface 616, it is displayed as the top platter (e.g., each platter described herein).

Severe weather alert platter 662 provides an indication that the weather conditions at physical location 622a includes strong winds (e.g., or any other type of severe weather (e.g., tornado, hurricane, tsunami, forest fire)). In some embodiments, weather user interface 616 includes severe weather alert platter 662 if a determination is made that weather conditions at physical location 622a satisfy a severe weather criteria (e.g., weather conditions at physical location 622a include a tornado, tsunami, hurricane, potential flooding, wildlife fire). In some embodiments, weather user interface 616 includes more than one severe weather alert platter 662. In some embodiments, weather user interface includes severe weather alert platter 662 and does not include precipitation chart 640.

As illustrated in FIG. 6F, as a part of displaying weather user interface 616, computer system 600 concurrently displays severe weather alert platter 662, precipitation platter 640, hourly forecast platter 612, and a portion of precipitation map platter 614. Severe weather alert platter 662 is displayed directly above precipitation platter 640 and precipitation platter 640 is displayed in between hourly forecast platter 612 and severe weather alert platter 662.

As illustrated in FIG. 6F, weather user interface 616 includes an animation of rain falling at an angle (e.g., from the right of weather user interface 616 to the left of weather user interface 616). Because there are strong winds at physical location 622a, the animation of rain falls diagonally and not simply on a vertical plain. That is, the animation of rain is representative of real world conditions. The rain animation of FIG. 6F interacts with severe weather alert platter 662 because severe weather alert platter 662 is displayed at the top platter in weather user interface 616. At FIG. 6F, computer system 600 detects upward swipe gesture 650f on weather user interface 616.

At FIG. 6G, in response to detecting upward swipe 650f, computer system 600 scrolls weather user interface 616. In FIG. 6G, weather user interface 616 includes precipitation map platter 614 directly above daily forecast platter 624. As described above in relation to FIG. 6B, if it is not raining at physical location 622a, daily forecast platter 624 is located above precipitation map platter 614. However, because it is raining at physical location 622a, precipitation map platter 614 is located directly above daily forecast platter 624. That is, the order that precipitation map platter 614 and daily forecast platter 624 in weather user interface 616 is dependent upon the weather conditions at physical location 622a. In some embodiments, if weather conditions (e.g., poor air quality or smog) at physical location 622a correspond to air quality map platter 606, then air quality map platter 606 is located directly above daily forecast platter 624. At FIG. 6G, computer system 600 detects tap gesture 650g on precipitation map platter 614. In some embodiments, computer system 600 detects tap gesture 650g on air quality map platter 606.

As illustrated in FIG. 6H, in response to detecting tap gesture 650g, computer system 600 displays map 638 of physical location 622a. As illustrated in FIG. 6H, map 638 takes up the entirety of the display of computer system 600. Map 638 includes an animation (e.g., an overlay) of real world precipitation conditions at physical location 622a. As illustrated in FIG. 6H, map 638 includes location icon 682 and location icon 684. Location icon 682 is representative of physical location 622a. Location icon 684 is representative of physical location 622b (e.g., San Jose) as discussed above in relation to FIG. 6D. Both location icon 682 and location icon 684 include a graphical representation of the real time weather conditions at the location represented by each location icon 682 and location icon 684. In some embodiments, map 638 takes up less than the entirety of the display of computer system 600.

As illustrated in FIG. 6H, map 638 includes an animation of real world precipitation conditions that are associated with physical location 622a, legend 688, and scrubber control 676. The animation of the precipitation conditions is displayed with a color gradient that is representative of the intensity of the precipitation conditions. As indicated by legend 688, the darker the color in the color gradient of the animation, the more intense the precipitation condition.

At FIG. 6H, activation of scrubber control 676 causes the animation to animate in a looping pattern. The looping pattern corresponds to both a historical representation of the precipitation conditions at physical location 622a and a forecasted representation of the precipitation conditions (e.g., the looping pattern illustrates the behavior of the precipitation conditions in the past and the predicted behavior of the precipitation conditions in the future). In some embodiments, map 638 includes a representation (e.g., a color gradient) of the temperature conditions at physical location 622a. In some embodiments, map 638 is a representation (e.g., a color gradient) of air quality at physical location 622a.

Figure 6I:
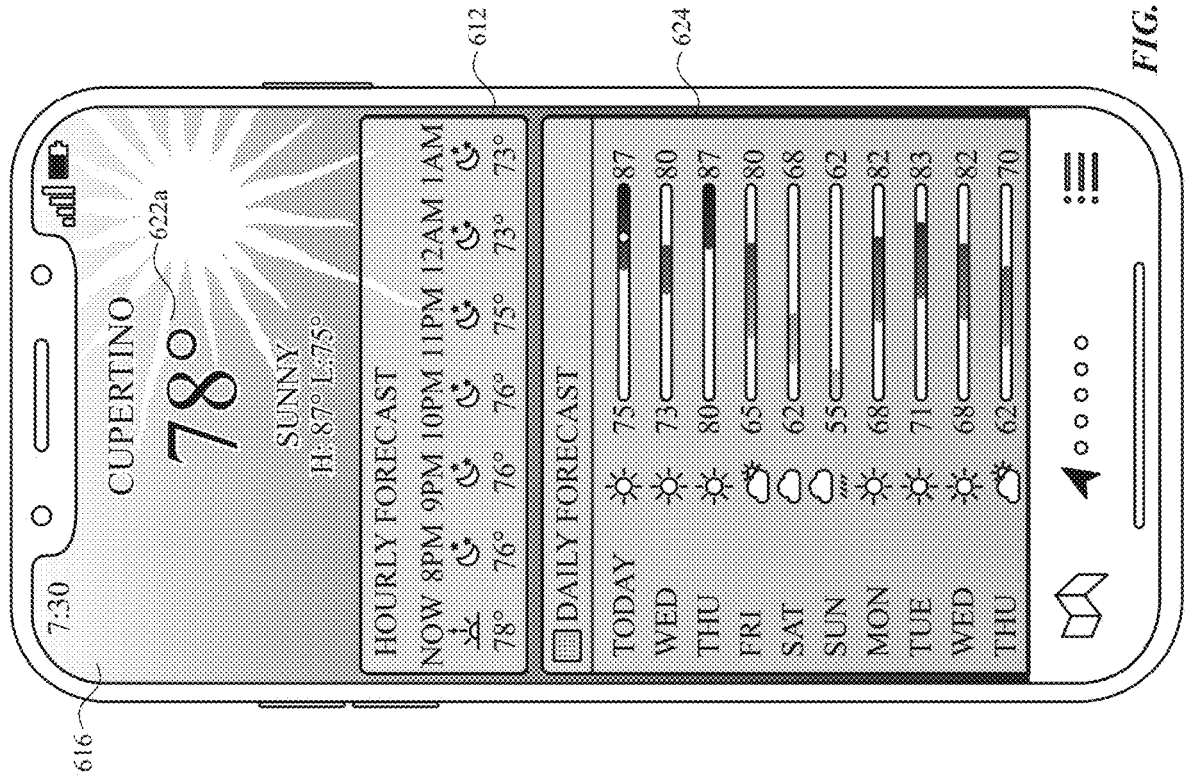

At illustrated in FIG. 6I, weather user interface 616 of FIG. 6I is displayed during the evening of a third day (e.g., a day (e.g., a non-sequential day with respect to the first day and the second day) that is different than the first day as discussed above in relation to FIG. 6B and the second day as discussed above in relation to FIG. 6E) for physical location 622a. As illustrated in FIG. 6I, weather user interface 616 includes a representation of the sun in the upper right-hand corner because weather user interface 616 of FIG. 6I represents the evening of the third day. As described above in relation to FIG. 6B, the location of the representation of the sun is representative of the real world location of the sun at physical location 622a. Because weather user interface in FIG. 6I is displayed during the evening, the representation of the sun is displayed in the upper right hand corner to signify that the sun will set soon.

As illustrated in FIG. 6I, weather user interface 616 is displayed with a color gradient that is representative of the time of day. Because weather user interface 616 of FIG. 6I is displayed during the evening of the third day, the color gradient included in weather user interface 616 is representative of a sunset (e.g., the color gradient includes colors (e.g., warm colors such as orange, red, and yellow) that are representative of a sunset). As the day progress into night, computer system 600 updates the display of the color gradient such that the color gradient is repetitive of the night (e.g., the color gradient includes colors (e.g., different shades of black and grey) that are representative of night).

FIG. 7 is a flow diagram illustrating a method for managing weather information using a computer system in accordance with some embodiments. Method 700 is performed at a computer system (e.g., 100, 300, 500) (e.g., a smartphone, a desktop computer, a laptop, a tablet, a smart watch) that is in communication with a display generation component (e.g., a display controller, a touch-sensitive display system). In some embodiments, the computer system is in communication with one or more input devices (e.g., a touch-sensitive surface). In some embodiments, the computer system is in communication with one or more input devices (e.g., a touch-sensitive surface). Some operations in method 700 are, optionally, combined, the orders of some operations are, optionally, changed, and some operations are, optionally, omitted.

As described below, method 700 provides an intuitive way for managing weather information. The method reduces the cognitive burden on a user for managing weather information, thereby creating a more efficient human-machine interface. For battery-operated computing devices, enabling a user to manage weather information faster and more efficiently conserves power and increases the time between battery charges.

The computer system (e.g., 600) displays (702), via the display generation component (e.g., 602), a weather user interface (e.g., 616), wherein displaying the weather user interface includes: in accordance with (704) a determination that one or more weather conditions (e.g., current weather conditions or weather conditions forecasted for the future) (e.g., rainstorm, snowstorm, weather air quality conditions) associated with a location (e.g., real world, physical location) (e.g., one or more weather conditions that are currently occurring at the location of the computer system) satisfies a first set of weather condition criteria (e.g., one or more weather conditions is a rainstorm, a snowstorm, a hailstorm, and/or weather air quality conditions) (e.g., current and/or forecasted weather conditions at a location are of a certain magnitude (e.g., heavy rain, heavy snow, dangerous air quality levels)), displaying a first user interface object of a first type (e.g., 640, 662) (e.g., precipitation, severe weather alert user interface objects) (e.g., a user interface object that is conditionally included in the weather user interface when weather conditions at a location satisfy the criteria) (e.g., a user interface object that includes information (e.g., forecast of first type of weather condition, air quality metric) regarding the weather condition at the location); and in accordance with (706) a determination that the one or more weather conditions associated with the location do not satisfy the first set of weather condition criteria (e.g., weather conditions are not a rainstorm, a snowstorm, a hailstorm and/or weather air quality conditions) (e.g., current and/or forecasted weather conditions at the location of the computer system are not of a certain magnitude (e.g., heavy rain, heavy snow, dangerous air quality levels)), forgo displaying the first user interface object (e.g., 640, 662). In some embodiments, the first user interface object is selectable to cause display of additional information about the one or more weather conditions. In some embodiments, the first of user interface object corresponds to a first type of weather condition (e.g., current weather conditions or forecasted weather conditions at the location)

Wherein displaying the weather user interface includes the computer system displaying (708) a second user interface object (e.g., 624, 612) and a third user interface object of (e.g., 618, 606, 614) a second type (e.g., a user interface object (e.g., 624, 612, 618, 606, 614) that is always included in the weather user interface) (e.g., a persistent, hourly forecast user interface object) (e.g., a user interface object (that contains real-time weather information (e.g., map of precipitation (e.g., 614), map of air quality (e.g., 606), weather forecast for a range of days (e.g., ten days)) for the location (e.g., 624)) (e.g., that corresponds to weather conditions at the location), wherein: in accordance with (710) a determination that the one or more weather conditions associated with the location satisfy a second set of weather condition criteria (e.g., one or more weather conditions is rainstorm, snowstorm, hailstorm, dangerous weather air quality) (e.g., current and/or forecasted weather conditions at the location of the computer system are of a certain magnitude (e.g., heavy rain, heavy snow, dangerous air quality levels)), the second user interface object and the third user interface object are displayed in a first order (e.g., the order of precipitation map platter 614 and daily forecast platter 624 in FIG. 6B) (e.g., an order relative to a terminal end of the weather user interface or computer system; an order relative to the third user interface object (e.g., (e.g., relative to the position of the third user interface object)) (e.g., the second user interface object is displayed before the third user interface object in an ordered listing/presentation of the user interface objects of the weather user interface (e.g., the order of daily forecast platter 624 and precipitation map platter 614 in FIG. 6B)) (e.g., the second user interface object is displayed at a location closer to a first terminal end of the weather user interface or the computer system than the third user interface object) (e.g., the second user interface object is displayed above the third user interface object. In some embodiments, the second user interface object is displayed at a first location in the weather user interface (e.g., the location of either hourly forecast platter 612 or daily forecast platter 624). In some embodiments, the first set and second set of weather condition criteria are the same. In some embodiments, the first set and second set of weather condition criteria are different. In accordance with (712) a determination that the one or more weather conditions associated with the location satisfy a third set of weather condition criteria, different from the second set of weather condition criteria, the second user interface object and the third user interface object are displayed in a second order (e.g., order of precipitation map platter 614 and daily forecast platter 624 in FIG. 6G), different from the first order (e.g., the second user interface object is displayed at a location closer to a second terminal end (e.g., opposite the first terminal end) of the weather user interface or the computer system than the third user interface object) (e.g., the second user interface object is displayed beneath the third user interface object. In some embodiments, the second user interface (e.g., 624, 612) object is displayed at a second location (e.g., the location of the daily forecast platter in FIG. 6G) in the weather user interface), different from the first location (e.g., the second location is beneath the first location)). In some embodiments, the first user interface object (e.g., 640, 662), the second user interface object (e.g., 624, 612), and the third user interface object (e.g., 618, 606, 614) are all associated with different type of weather conditions. In some embodiments, when the weather user interface includes the first user interface object (e.g., 640, 662) and the second type of user interface object, the computer system concurrently displays both the first user interface object (e.g., 640, 662) and the second type of user interface object (624, 612, 618, 606, 614). In some embodiments, when the weather user interface (e.g., 616) includes the first user interface object (e.g., 640, 662) and the second type of user interface object (624, 612, 618, 606, 614), the computer system does not concurrently display the first user interface object and the second type of user interface object. In some embodiments, the first set and third set of weather condition criteria are the same. In some embodiments, the first set and third set of weather condition criteria are different. Displaying a first user interface (e.g., that includes weather information at a location) provides a user with visual feedback with respect to current weather conditions at a location, which provides improved visual feedback. Displaying a second user interface object (e.g., that includes weather information at a location) and a third user interface object (e.g., that includes weather information at a location) in a first order when one or more weather conditions associated with a location satisfy a second set of weather condition criteria provides the a user with visual feedback regarding weather conditions at the location, which provides improved visual feedback. Automatically displaying a first user interface object of a first type when certain prescribed conditions are met (e.g., in accordance with a determination that one or more weather conditions associated with a location satisfies a first set of weather conditions) automatically provides the user with information regarding the weather conditions at a location, which performs an operation when a set of conditions has been met without requiring further user input. Automatically displaying a second user interface object and a third user interface object in a first order when certain prescribed conditions are met (e.g., in accordance with one or more weather conditions associated with the location satisfy a second set of weather condition criteria) automatically provides the user with relevant weather information regarding the weather conditions at a location, which performs an operation when a set of conditions has been met without requiring further user input.

In some embodiments, in accordance with a determination that the one or more weather conditions associated with the location are of a first type of weather condition (e.g., tornado, hurricane, strong winds, tsunami, drought, wildlife fire), the first user interface object (e.g., 640, 662), of the first type is a first type of conditional platter (e.g., precipitation platter, or severe weather platter) (e.g., a platter that is not always included in the weather user interface) (e.g., a severe weather information platter (e.g., a platter that indicates that weather conditions at the location that corresponds to the weather user interface are of a dangerous/severe nature (e.g., tornado, hurricane, strong winds, tsunami, drought, wildlife fire). In some embodiments, in accordance with a determination that the one or more weather conditions associated with the location are of a second type of weather condition (e.g., rain, snow, hail), the first user interface object of the first type is a second type of conditional platter (e.g., precipitation platter, or severe weather platter (e.g., a platter that is not always included in the weather user interface) (e.g., a precipitation platter (e.g., a platter that indicates that weather conditions at the location that corresponds to the weather user interface include precipitation (e.g., snow, hail, snow), different (e.g., second type of conditional platter includes different weather related information) from the first type of conditional platter. Displaying a first type of conditional platter (e.g., that indicates weather at the location) when certain prescribed conditions are satisfied (e.g., in accordance with a determination that the one or more weather conditions are of a first type of weather condition) automatically provides the user with information specific to weather conditions at a location, which performs an operation when a set of conditions has been met without requiring further user input.

In some embodiments, the first type of the conditional platter (e.g., 640, 662) includes information (e.g., information regarding the current weather conditions or forecasted weather conditions) (e.g., information in precipitation platter and severe weather platter) related to the first type of weather condition and the second type of conditional platter (e.g., 640, 662) includes information (e.g., information in precipitation platter and severe weather platter) (e.g., information regarding the current weather conditions or forecasted weather conditions) related to the second type of weather condition. In some embodiments the first type of conditional platter does not include information related to the second type of one or more weather conditions. In some embodiments, the second type of conditional platter does not include information related to the first type of one or more weather conditions.

In some embodiments, the second user interface object (e.g., 624, 612) of the second type and the third user interface object (e.g., 618, 606, 614) of the second type are each independently selected from the group consisting of an air quality platter (e.g., 618) that includes air quality information; an air quality map platter (e.g., 606) that includes a map and air quality information for at least one location on the map; a precipitation map platter (e.g., 614) that includes a second map and precipitation information (e.g., a precipitation forecast (e.g., a forecast of a chance of precipitation; a forecast of an amount of precipitation)) for at least one location on the second map; a multi-day forecast platter (e.g., 624) that includes weather forecast information for a plurality of days (e.g., as discussed in relation to FIG. 8B); and an hourly forecast platter (e.g., 612) that includes weather forecast information for a plurality of hours.

In some embodiments, displaying the weather user interface (e.g., 616) includes: in accordance with a determination that a set of display position criteria are satisfied, the set of display position criteria including a criterion that is satisfied when the first user interface object (e.g., 640, 662) of the first type is not to be displayed (e.g., not displayed), displaying the second user interface object (e.g., 624, 612) of the second type or the third user interface object (e.g., 618, 606, 614) of the second type at a first position (e.g., the position of hourly forecast platter 612 in FIG. 6C, the position of precipitation platter 640 in FIG. 6E) (e.g., location (a location that is at one terminus of the weather user interface (a top/upper terminus (e.g., at the top of the set of displayed weather-related user interface objects)) in the weather user interface (e.g., 616); and in accordance with a determination that the first user interface object (of the first type is to be displayed (e.g., is displayed), displaying the second user interface object and the third user interface object of the second type at positions in the weather user interface that are other than the first position (e.g., positions that are further from the one terminus of the weather user interface than the first position (e.g., lowered ordered positions) (e.g., the position of hourly forecast platter 612 in FIG. 6C, the position of precipitation platter 640 in FIG. 6E). In some embodiments, in accordance with a determination that the one or more weather conditions associated with the location do not satisfy the first set of weather condition criteria. In some embodiments, the first user interface object of the first type is displayed at the first position while the second user interface object and the third user interface object are displayed at positions other than the first position. In some embodiments, user interface objects of the first type, when displayed, are displayed higher in a display order than user interface objects of the second type (e.g., 618, 606, 614, 624, 612). Displaying the second user interface object and the third user interface object of the second type at positions that are other than the first position (e.g., the top of the weather user interface) when certain prescribed conditions are satisfied (e.g., in accordance with a determination that the first user interface object is displayed) automatically prioritizes certain user interface objects (e.g., and information included in the user interface object) over other user interface objects, which performs an operation when a set of conditions has been met without requiring further user input.

In some embodiments, the computer system (e.g., 600) displays a fourth user interface object (e.g., 614) of the first type, wherein: in accordance with a determination that the first user interface object (e.g., 662) of the first type is not to be displayed, the fourth user interface object of the first type is displayed at the first position (e.g., the position of precipitation map platter 614 in FIG. 6G); and in accordance with a determination that the first user interface object of the first type is to be displayed, the first user interface object of the first type is displayed at the first position. In some embodiments, the fourth user interface object of the first type is displayed at a second position (e.g., the position of precipitation platter 640 in FIG. 6F) adjacent to the first position. In some embodiments, the second position is closer to the one terminus of the weather user interface than the positions at which the second user interface object (e.g., 624, 612) of the second type and the third user interface object (e.g., 618, 606, 614) of the second type are displayed. In some embodiments, certain user interface objects of the first type are, when they are both displayed, displayed higher in a display order than certain other user interface objects of the first type. Automatically displaying a first user interface object interface at a first position (e.g., at the top of the weather user interface) while a fourth user interface object is displayed when a set of prescribed conditions are satisfied (e.g., in accordance with a determination that the first user interface object is to be displayed), automatically prioritizes the display of one user interface object over a different user interface object, which performs an operation when a set of conditions has been met without requiring further user input.

In some embodiments, the second user interface object of the second type includes a map (e.g., 606, 614) (e.g., a map of the location) (e.g., a map that includes precipitation (e.g., snow, rain, hail) information for the location) (e.g., a map that includes air quality information for the location) of a first size (e.g., map included in 606, 614 in FIG. 6B). In some embodiments, the computer system is in communication with one or more input devices. While displaying the second user interface object, the computer system (e.g., 600) detects, via the one or more input devices, a first input (e.g., a tap input) (or, in some embodiments, detecting a non-tap input (e.g., a swipe, rotational input, and/or a mouse click) (e.g., 650g) that corresponds to selection of the second user interface object of the second type. In response to detecting the first input, the computer system displays the map (e.g., 638) at a second size (e.g., a size that takes up the entire display of the computer system) (e.g., different (e.g., larger than) from the first size. Changing a size of the map from a first size to a second that that is different from the first size in response to detecting a second input provides the user with more control over the computer system by allowing the user to determine the content that is shown in the map, which provides additional control options without cluttering the user interface. Displaying the map at a second size (e.g., larger than the first size) allows a user to view and analyze the additional contents of the map with, which provides improved visual feedback.

In some embodiments, displaying the map (e.g., 638) at the second size includes displaying a scrubber control (e.g., 676) and a precipitation overlay. In some embodiments, while displaying the map at the second size, the computer system (e.g., 600) detects, via one or more input devices, a second input (e.g., a tap input) (or, in some embodiments, detecting a non-tap input (e.g., a swipe, rotational input, and/or a mouse click) that corresponds to a request to activate the scrubber control. In response to detecting the second input to activate the scrubber control, the computer system displays an animation (e.g., an animation of the behavior (e.g., historical behavior, future behavior) of the precipitation conditions) of the precipitation overlay transitioning across (e.g., from a first location in the weather user interface to a second location in the weather user interface) the map at the second size. In some embodiments, the map includes two or more overlays. Displaying an animation of the precipitation overlay transitioning across the map in response to detecting a second input provides a user with greater control by allowing the user to determine when the precipitation overlay is animated and when the precipitation overlay is not animated, which provides additional control options without cluttering the user interface. Displaying the animation of the precipitation overlay transitioning across the map of a location provides a user with visual feedback regarding weather conditions at the location, which provides improved visual feedback.

In some embodiments, while the map is at the second size, the map includes at least a first representation (e.g., 682, 684) of a city of interest (e.g., a city that has been previously selected (e.g., by a user) as a city of interest). In some embodiments, a representation of the location (e.g., the location of the computer system) is displayed concurrently with the representation of the city of interest). In some embodiments, the first representation of the city of interest is not included in the precipitation map at the first size. Including a first representation of a city of interest while a map is displayed at a second size provides the user with visual feedback regarding a physical location that is of particular relevance to the interests of the user, which provides improved visual feedback.

In some embodiments, while displaying the second user interface object (e.g., 624, 612) and the third user interface object (e.g., 618, 606, 614), the computer system (600) displays, via the display generation component, in accordance with a determination that the one or more weather conditions satisfy a third set of weather condition criteria, a first dynamic representation (e.g., a graphical animation of the current weather conditions at the location; an animated background) (e.g., the representation of current weather conditions in in FIGS. 6B, 6C, 6D, 6E and 6F) of a first weather condition (e.g., rain; snow). In some embodiments, in accordance with a determination that the one or more weather conditions satisfy a fourth set of weather condition criteria, a second dynamic representation (e.g., the representation of current weather conditions in in FIGS. 6B, 6C, 6D, 6E and 6F), different from the first dynamic representation, of a second weather condition that is different from the first weather condition. In some embodiments, the dynamic representation of the one or more weather conditions are displayed while first user interface object, the second user interface object, and the third user interface object are displayed. Automatically displaying a first dynamic representation of a first weather condition when certain prescribed conditions are satisfied (e.g., in accordance with a determination that the one or more weather conditions satisfy a third set of weather condition criteria)

automatically provides the user with information with respect to various characteristics of one or more weather conditions at the location, which performs an operation when a set of conditions has been met without requiring further user input. Displaying a first dynamic representation of a first weather condition provides visual feedback to a user with respect to the type of the first weather condition, which results in improved visual feedback.

In some embodiments, displaying the first dynamic representation includes displaying a first animated interaction of the first dynamic representation with one or more of the first user interface object of the first type (e.g., 662, 640), the second user interface object of the second type (e.g., 624, 612), and the third user interface object (e.g., 618, 606, 614) of the second type, wherein the first animated interaction is based on the first weather condition. In some embodiments, the first animated interaction occurs at a top edge of one or more of the user interface objects.

In some embodiments displaying the second dynamic representation (e.g., the representation of current weather conditions in in FIGS. 6B, 6C, 6D, 6E and 6F) includes displaying a second animated interaction of the first dynamic representation with one or more of the first user interface object (e.g., 662, 640) of the first type, the second user interface object (e.g., 624, 612) of the second type, and the third user interface object (e.g., 618, 606, 614) of the second type, wherein the second animated interaction is based on the second weather condition. Displaying a second animated interaction of the first dynamic representation that is based on a second weather condition provides a user with visual feedback regarding the type of weather condition that is associated/represented by the second weather condition, which results in improved visual feedback.

In some embodiments, the location corresponds to a physical location (e.g., 622*a*) (e.g., a geolocation) of the computer system.

In some embodiments, the first dynamic representation (e.g., as shown in FIGS. 6B-6D, and 6I) of the one or more weather conditions includes a representation of the sun. In some embodiments, in accordance with a determination that the physical position (e.g., a location of the sun in the sky at the location of the computer system) of the sun at the location is a first solar position (e.g., based on the latitude of the location and the time of year and time of day), the computer system (e.g., 600) displays the representation of the sun at a second position (e.g., a location that is representative of the physical position of the sun) (e.g., the position of the representation of the sun in FIG. 6B) in the weather user interface. In some embodiments, in accordance with a determination that the physical position of the sun at the location is a second solar position, the computer system (e.g., 600) displays the representation of the sun at a third position (e.g., the position of the representation of the sun in FIG. 6I) in the weather user interface (e.g., 616) different from (e.g., at a different location in the weather user interface) the second position. In some embodiments, the computer system makes the determination of the physical location (e.g., 622*a*, 622*b*) of the sun at the location. Displaying a representation of the sun at a second position when certain prescribed conditions are satisfied (e.g., in accordance with a determination the physical location of the sun at the location is at a first solar position) automatically provides a user with the ability to determine the solar position of the sun at the location, which performs an operation when a set of conditions has been met without requiring further input. Displaying a representation of the sun at a second position when the sun is at a first solar position and displaying the representation of the at a third position when the sun is at a second position provides the user with visual feedback with respect to the current solar location of the sun in a physical environment, which results in improved visual feedback.

In some embodiments, the first dynamic representation and/or the second dynamic representation (e.g., the representation of current weather conditions in in FIGS. 6B, 6C, 6D, 6E and 6F) have a first visual characteristic that varies based on (e.g., that is dependent on, that is based on) a weather characteristic (e.g., an amount of rain, snow, and/or wind; a direction of the wind, rain, and/or snow) of the one or more weather conditions at the location. Varying a visual characteristic of a first dynamic representation or a second dynamic representation based on a weather characteristic of one or more weather conditions at a location provides a user with visual feedback concerning at least one characteristic of the weather conditions at the location, which results in improved visual feedback.

In some embodiments, the map includes a temperature overlay and not a precipitation overlay. In some embodiments, the map with the temperature overlay does not include a scrubber. In some embodiments, the map includes an air quality overlay and not the precipitation overlay. In some embodiment, the map with the air quality overlay does not include a scrubber.

Note that details of the processes described above with respect to method 700 (e.g., FIG. 7) are also applicable in an analogous manner to the methods described herein. For example, method 900 optionally includes one or more of the characteristics of the various methods described above with reference to method 700. For example, a first user interface object of a first type (e.g., a conditional platter) according to method 700 can be displayed in a weather user interface that corresponds to a first cumulative period of time, in accordance with method 900. For brevity, these details are not repeated below.

FIGS. 8A-8E illustrate exemplary user interfaces for displaying daily weather information, in accordance with some embodiments. The user interfaces in these figures are used to illustrate the processes described below, including the processes in FIG. 9.

Figure 8B:
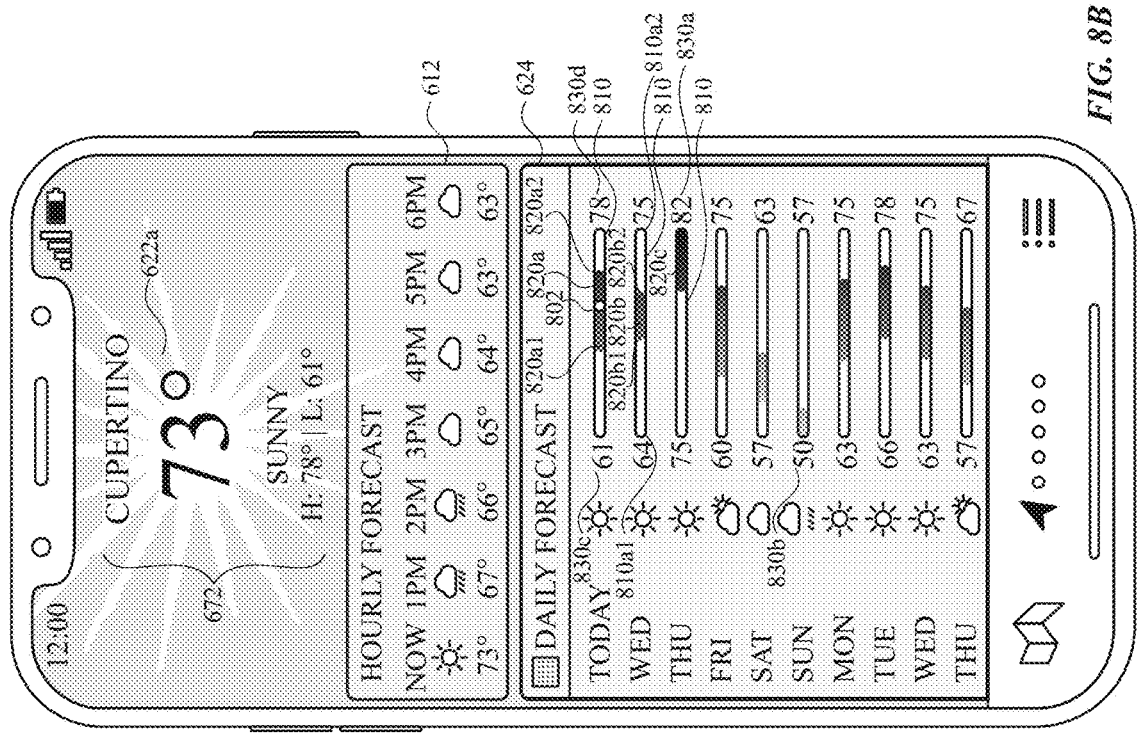
FIGS. 8A-8E illustrate exemplary user interfaces for displaying daily weather information.
Figure 8A:
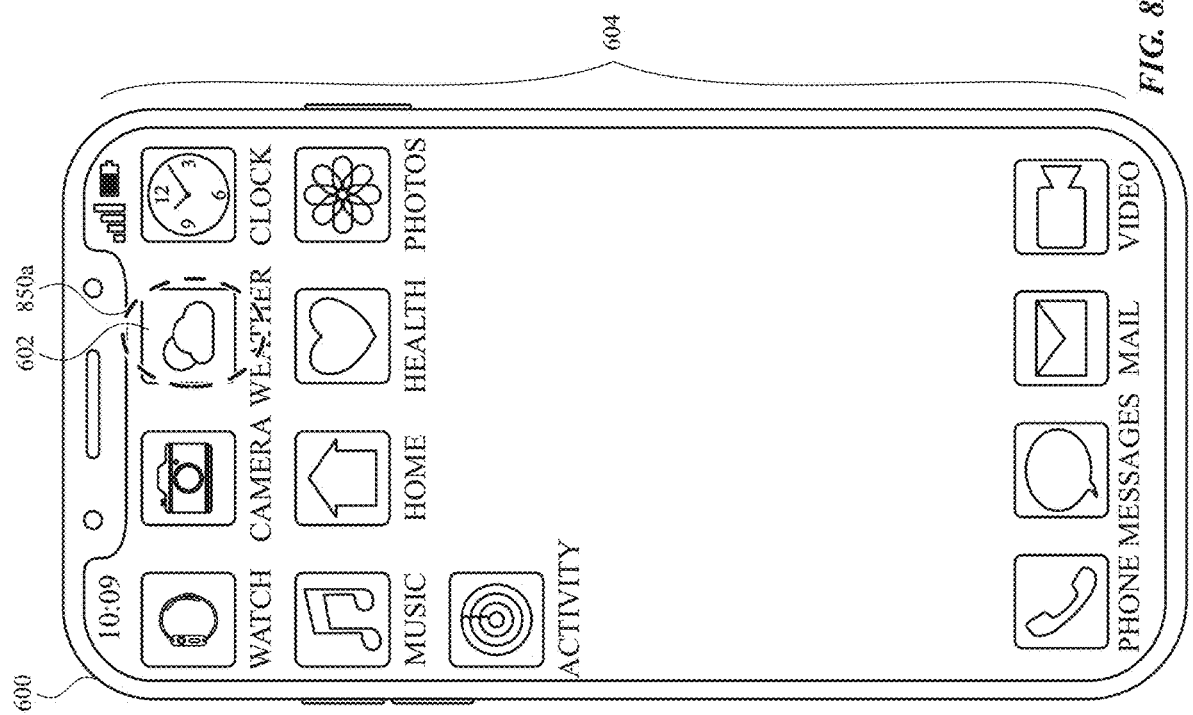

FIG. 8A illustrates computer system 600 displaying home screen user interface 604 that includes application icons 680. Each application icon represents a corresponding application. In some embodiments, in response to detecting an input directed to one of the application icons, computer system 600 launches an application that corresponds to the selected application icon. At FIG. 8A, computer system 600 detects tap gesture 850*a* on application icon 680*a* that corresponds to a weather application.

As illustrated in FIG. 8B, in response to detecting tap gesture 850*a*, computer system 600 displays a portion of weather user interface 616 (e.g., as described above in relation to FIG. 6B). As a part of displaying weather user interface 616, computer system 600 concurrently displays hourly forecast platter 612 (e.g., as described above in relation to FIG. 6B), daily forecast platter 624 (e.g., as described above in relation to FIG. 6B) and summary region 672 (e.g., as described above in relation to FIG. 6B). Daily forecast platter 624 includes weather information for a range of 10 days. Summary region 672 indicates that physical location 622*a* associated with weather user interface 616 is Cupertino and that the current temperature at Cupertino is 73 degrees.

As illustrated in FIG. 8B, daily forecast platter 624 includes a number of cumulative bars 810. Cumulative bar 810 indicates a range of a temperature value for physical location 622*a* over a time period (e.g., 10 days that are included in daily forecast platter 624). Leftmost portion 810*a*1 of cumulative bar 810 represents the low temperature for the time period and rightmost portion 810*a*2 of cumulative bar 810 represents the high temperature for the time period. As illustrated in FIG. 8B, daily forecast platter 624 includes a numerical representation for the temperature range of each day in the 10-day time period. Temperature indicator 830*a* represents the hottest temperature during the time period (e.g., 82 degrees) while temperature indicator 830*b* represents the coldest temperature during the time period (e.g., 50 degrees); that is, the first Thursday has the hottest high temperature for the 10-day period whereas the Sunday has the coolest low temperature for the period. Accordingly, leftmost portion 810*a*1 of cumulative bar 810 corresponds to a temperature value of 50 and rightmost portion 810*a*2 of cumulative bar 810 corresponds to a temperature value of 82. In some embodiments, cumulative bars 810 indicates a cumulative range for a weather value that is not temperature (e.g., humidity, precipitation, or any other suitable weather value).

As illustrated in FIG. 8B, daily forecast platter 624 includes daily range sub-bar 820*a*, daily range sub-bar 820*b*, and daily range sub-bar 820*c* corresponding to the current day, the next day (a Wednesday), and the day after that (a Thursday), respectively. Each of daily sub-bar 820*a*, daily range sub-bar 820*b*, and daily range sub-bar 820*c* indicate a temperature range for a respective day in the period of time. That is, daily range sub-bar 820*a*, indicates the range of temperature values for the current day daily range sub-bar 820*b* indicates the range of temperature values for the next day (a Wednesday), and daily range sub-bar 820*c* indicates the range of temperature values for the day after next (a Thursday). The temperature range that is represented by each daily range sub-bar falls within the temperature range that is represented by cumulative bar 810. In some embodiments, daily range sub-bars 820*a*, 820*b*, and 820*c* indicates a daily range for a weather value that is not the temperature (e.g., humidity or precipitation, or any other suitable weather value).

As illustrated in FIG. 8B, daily forecast platter 624 includes temperature indicator 830*c* and temperature indicator 830*d*. Temperature indicator 830*d* indicates the highest temperature value (e.g., 78) for the day that corresponds to daily range sub-bar 820*a*. Temperature indicator 830*c* indicates the lowest temperature (e.g., 61) for the day that corresponds to daily range sub-bar 820*a*. Leftmost portion 820*a*1 of daily range sub-bar 820*a* is representative of the lowest temperature of the day that that corresponds to daily range sub-bar 820*a*. Rightmost portion 820*a*2 of daily range sub-bar 820*a* is representative of the highest temperature of the day that corresponds to daily range sub-bar 820*a*. Accordingly, rightmost portion 820*a*2 of daily range sub-bar 820*a* corresponds to a temperature value of 78 and leftmost portion 820*a*1 of daily range sub-bar 820*a* corresponds to a temperature value of 61.

The length of a respective daily range sub-bar corresponds to the difference between the high temperature value and the low temperature value for the respective daily range sub-bar. The larger the difference between the high temperature value and the low temperature value, the longer the respective daily range sub-bar. Conversely, the smaller the difference between the high temperature value and the low temperature value, the shorter the respective daily range sub-bar. The difference between the high temperature and low temperature for the day that corresponds to daily range sub-bar 820*a* and daily range sub-bar 820*b* are, respectively, 17 and 11 degrees. Accordingly, as illustrated in FIG. 8B, daily range sub-bar 820*a* is longer than daily range sub-bar 820*b*.

The day that is represented by daily range sub-bar 820*a* is one of the warmer days in the 10-day period. Accordingly, daily range sub-bar 820*a* is positioned in the right hand side of cumulative bar 810. In contrast, Sunday is one of the colder days in the 10-day period. Accordingly, the daily range sub bar for Sunday is positioned in the left hand side of cumulative bar 810. The positioning of the daily range sub-bars makes it easy for a user to view weather user interface 616 and determine the warmest and coldest days over the 10-day period. For example, if a user wanted to plan an outdoor activity during the 10-day period, based on the positioning of the daily range sub-bars, the user will know that Sunday is not a good day to plan the outdoor activity while the current day is a good day to plan the outdoor activity.

As illustrated in FIG. 8B, daily range sub-bar 820*a* includes current temperature indicator 802. Current temperature indicator 802 indicates a current temperature at physical location 622*a*. Accordingly, current temperature indicator 802 is located within the daily range sub-bar that corresponds to the current day. Current temperature indicator 802 is located within daily range sub-bar 820*a* because daily range sub-bar 820*a* represents the current day and daily range sub-bars 820*b* and 820*c* represent subsequent days in the time period. In some embodiments, current temperature indicator 802 is a shape different from a circle (e.g., square, triangle, rectangle, or any other suitable shape). Because the current temperature at physical location 622*a* is 73 (e.g., as indicated by summary region 672), current temperature indicator is located at a position within daily range sub-bar 820*a* that corresponds to a temperature of 73.

The positioning of current temperature indicator 802 within daily range sub-bar 820*a* allows a user to easily determine how the current temperature at physical location 822*a* compares to the range of temperatures for the current day and the 10-day period. The cooler the current temperature is at physical location 622*a*, the further left current temperature indicator 802 will be positioned within daily range sub-bar 820*a*. Conversely, the warmer the current temperature is at physical location 622*a*, the further right current temperature indicator 802 will be positioned within daily range sub-bar 820. Similar to the position of current temperature indicator 802 in daily range sub-bar 802*a*, the position of current temperature indicator 802 in cumulative bar 810 indicates how the current temperature compares to the range of temperatures for the 10-day period. Accordingly, a user may, simultaneously, determine how the current temperature compares to the range of temperatures values for the day and the range of temperatures for the 10-day period.

As illustrated in FIG. 8B, each of daily range sub-bar 820*a*, 820*b*, and 820*c* are located within (e.g., encompassed by) a respective cumulative bar 810. The position of a respective daily range sub-bar within cumulative bar 810 is dependent on how the range of temperature values associated with the respective daily range sub-bar compares with the range of temperature values for the time period. As illustrated in FIG. 8B, the low temperature for the day that corresponds to daily range sub-bar 820*a* is lower than the low temperature of the day that corresponds to daily range sub-bar 820*b*. This causes leftmost portion 820*a*1 of daily range sub-bar 820*a* to be positioned closer to leftmost portion 810*a*1 of cumulative bar 810 than leftmost portion 820*b*1 of daily range sub-bar 820*b*. Conversely, the high temperature for the day that corresponds to daily range sub-bar 820*a* is higher than the high temperature of the day that corresponds to daily range sub-bar 820*b*. This causes rightmost portion 820*a*2 of daily range sub-bar 820*a* to be positioned closer to rightmost portion 810*a*2 of cumulative bar 810 than rightmost portion 820*b*2 of daily range sub-bar 820*b*.

The above described placement of daily range sub-bars within cumulative bar 810 causes the daily range sub-bar that corresponds to the lowest temperature over the period of time to be positioned at leftmost portion 810*a*1 of cumulative bar 810 and the daily range sub-bar that corresponds to the highest temperature over the period of time to be positioned at rightmost portion 810*a*2 of cumulative bar 810. The above-described methodology makes it easy for a user who is viewing weather user interface 616 to determine the hottest day during the time period and the coldest day during the time period. In some embodiments, the daily range sub-bars are not located within a respective cumulative bar 810. In some embodiments, daily forecast platter 624 includes daily range sub-bars 820*a*, 820*b*, and 820*c* but does not include cumulative bar 810. In some embodiments, daily forecast platter 624 includes cumulative bar 810 but does not include daily range sub-bars 820*a*, 820*b*, and 820*c*.

As illustrated in FIG. 8B, each of daily range sub-bar 820*a*, 820*b*, and 820*c* are displayed with a color gradient. The colors in the color gradient are each representative of a temperature value. The temperature value that is represented by a particular color is the same for a color gradient that displayed as a part of daily range sub-bar 820*a* as the color gradient that is displayed as part of daily range sub-bar 820*b* or 820*c*. The color gradients for each of daily range sub-bars 820*a*, 820*b*, and 820*c* include a visual appearance that contrast with the visual appearance of cumulative bar 810 such that daily range sub-bars 820*a*, 820*b*, and 820*c* can be clearly seen. In some embodiments, the colors in the color gradient are each representative of a weather value that is not temperature (e.g., air quality values, precipitation values).

Lower temperature values are represented in the color gradient by cool colors (e.g., blue, purple, green) and higher temperature values are represented in the color gradient by warm colors (e.g., red, orange, yellow). The color gradient for a respective daily range sub-bar includes cool colors when temperature values associated with the respective daily range sub-bar are beneath a threshold and the color gradient for a respective daily range sub-bar includes warm colors when weather values for the respective daily range sub-bar exceed a certain threshold. The color gradient for a respective daily range sub-bar includes both cool colors and warm colors when the range of temperature values includes temperature values that are both below and above the threshold.

Figure 8C:
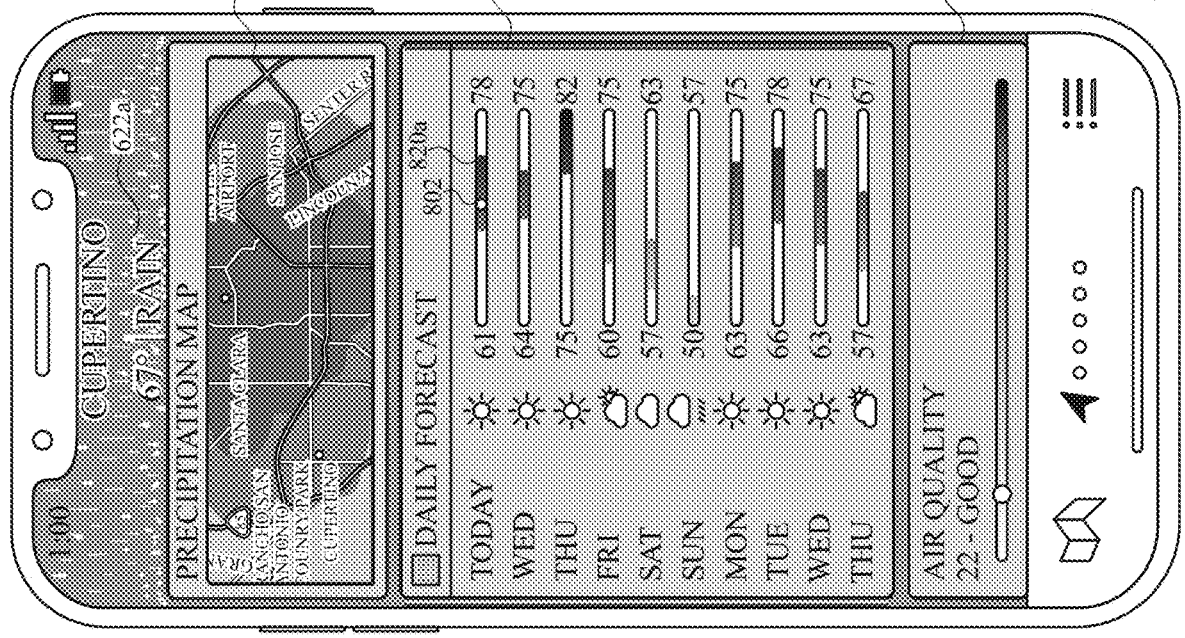

As illustrated in FIG. 8C, computer system 600 displays weather user interface 616 (e.g., a portion of weather user interface 616) 1 hour after the display of weather user interface 616 as described in relation to FIG. 8B. At FIG. 8C, a determination is made that it is raining at physical location 622*a* and that the temperature has decreased at the location. This causes summary region 672 to indicate that the current temperature is 67 and that it is raining at physical location 622*a*. Because a determination is made that it is raining at physical location 622*a*, weather user interface 616 includes precipitation platter 640 (e.g., as described above in relation to FIG. 6E) directly above hourly forecast platter 612 and precipitation map platter 614 (e.g., as described above in relation to FIGS. 6B and 6E) is located beneath hourly forecast platter 612. In some embodiments, computer system 600 has received updated weather information in comparison to the weather information that is shown in FIG. 8B. This causes computer system 600 to display the updated weather information. At FIG. 8C, computer system 600 detects upward swipe gesture 850*c* on weather user interface 616.

Figure 8D:
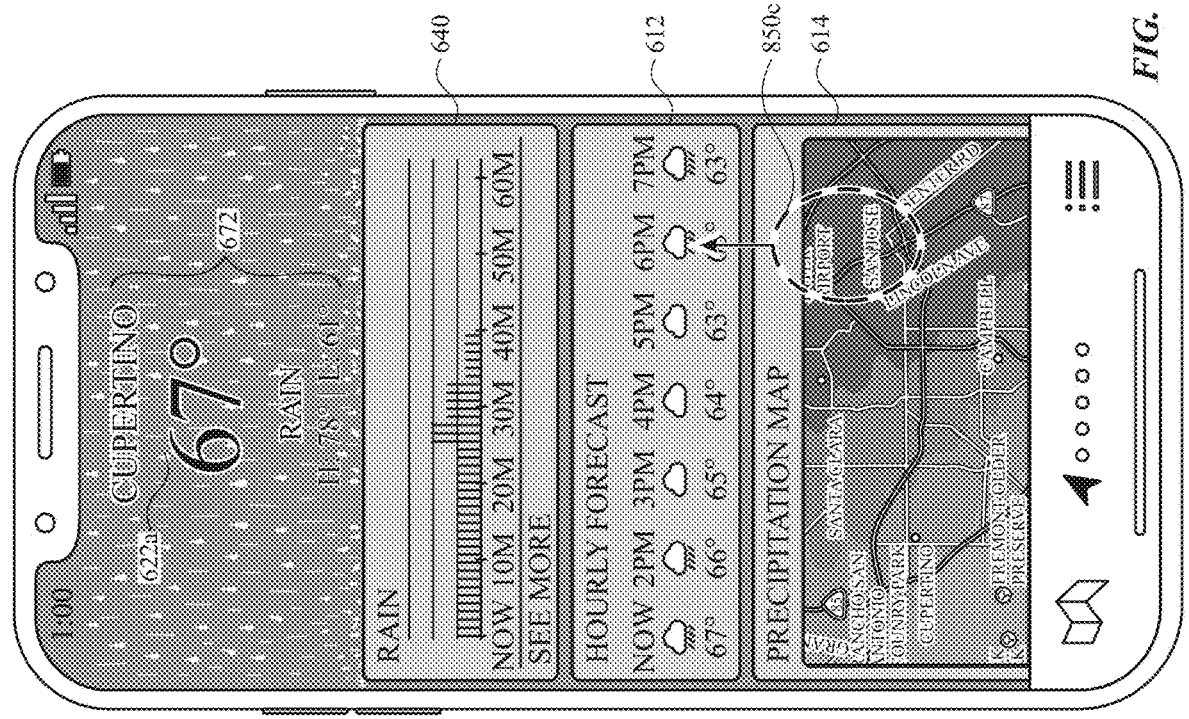

As illustrated in FIG. 8D, in response to detecting upward swipe gesture 850*c*, computer system 600 displays a second portion of weather user interface 616. Because a determination is made that it is raining at physical location 622*a*, daily forecast platter 624 and daily range sub-bar 820*a*, daily range sub-bar 820*b*, and daily range sub-bar 820*c* are located beneath the precipitation map platter 614 (e.g., as opposed to above precipitation map platter 614 as illustrated in FIG. 8B). That is, the positioning of daily forecast platter 624, daily range sub-bar 820*a*, daily range sub-bar 820*b*, and daily range sub-bar 820*c* within weather user interface 616 is dependent upon the weather conditions at physical location 622*a*.

As illustrated in FIG. 8D, daily range sub-bar 820*a* includes current temperature indicator 802. Because the temperature at physical location 622*a* is 67 degrees (as opposed to 73 degrees as shown in FIG. 8B), current temperature indicator 802 is positioned at a more leftward position in daily range sub-bar 820*a* in FIG. 8D in comparison to the positioning of current temperature indicator 802 in daily range sub-bar 820*a* in FIG. 8B.

Figure 8E:
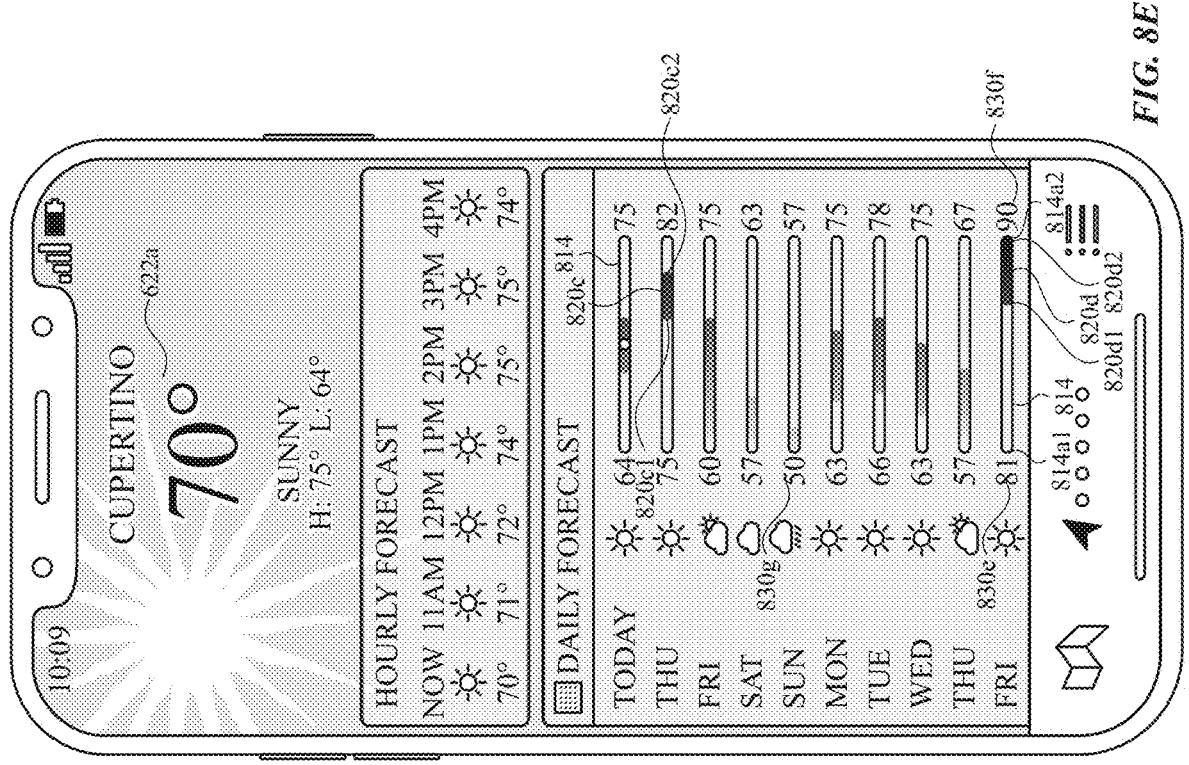

As illustrated in FIG. 8E, computer system 600 displays weather user interface 616 after 1 day has passed with respect to the display of weather user interface 616 as described in relation to FIGS. 8B, 8C, and 8D. Daily forecast platter 624 in FIG. 8E includes weather information for a new 10-day time period. As illustrated in FIG. 8E, weather user interface 616 includes daily range sub-bar 820*d* that is representative of a new day that was not included in the previous time period and does not include daily range sub-bar 820*a* that is representative of a day that was included in the previous time period. That is, the new period of time includes a new day that was not included in the previous period of time and does not include a day that was included in the previous period of time.

As illustrated in FIG. 8E, temperature indicator 830*e* indicates that the low temperature for the day that corresponds to daily range sub-bar 820*d* is 81 degrees while temperature indicator 830*f* indicates the high temperature for the day that corresponds to daily range sub-bar 820*d* is 90 degrees. Accordingly, leftmost portion 820*d*1 of daily range sub-bar 820*d* corresponds to a temperature value of 81 degrees and rightmost portion 820*d*2 of daily range sub-bar 820*d* corresponds to a temperature value of 90 degrees. As illustrated in FIG. 8E, weather user interface 616 includes cumulative bar 814. Cumulative bar 814 is different from cumulative bar 810 as described above in relation to FIG. 8B. Cumulative bar 814 indicates a range of temperature values for physical location 622*a* over the new time period. Leftmost portion 814*a*1 of cumulative bar 814 represents the low temperature for the new time period and rightmost portion 814*a*2 of cumulative bar 814 represents the high temperature for the new period of time. The day that is represented by daily range sub-bar 820*d* includes the highest temperature for the new time period. This causes rightmost portion 820*d*2 of daily range sub-bar 820*d* to be positioned at rightmost portion 814*a*2 of cumulative bar 814.

Temperature indicator 830*g* indicates that the low temperature for the new time period is 50 and temperature indicator 830*f* indicates that the high temperature for the new range of days is 90. Accordingly, leftmost portion

814*a*1 of cumulative bar 814 corresponds to a temperature value of 50 degrees and rightmost portion 814*a*2 of cumulative bar 814 corresponds to a temperature value of 90 degrees.

At illustrated in FIG. 8E, the temperature range that is associated with daily range sub-bar 820*c* is the same temperature range that is associated with daily range sub-bar 820*c* as discussed above in relation to FIG. 8B. In FIG. 8B, daily range sub-bar 820*c* included the hottest temperature for the previous time period. Accordingly, in FIG. 8B, daily range sub-bar 820*c* was positioned at rightmost portion 810*a*2 of cumulative bar 810. However, as illustrated in FIG. 8E, the high temperature value for the day that is represented by daily range sub-bar 820*c* is not the highest temperature for the new time period. This causes daily range sub-bar 820*c* to not be located at rightmost portion 814*a*2 of cumulative bar 814 similar to how daily range sub-bar 820*c* was positioned at rightmost portion 810*a*2 of cumulative bar 810. Rather, as illustrated in FIG. 8E, daily range sub-bar 820*c* is positioned to the left of rightmost portion 814*a*2 of cumulative bar 814. The position of each daily range sub-bar within weather user interface 616 has shifted to the left between FIGS. 8D and 8E to account for the new hottest temperature value.

FIG. 9 is a flow diagram illustrating a method for displaying daily weather information using a computer system in accordance with some embodiments. Method 900 is performed at a computer system (e.g., 100, 300, 500, 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface). Some operations in method 900 are, optionally, combined, the orders of some operations are, optionally, changed, and some operations are, optionally, omitted.

As described below, method 900 provides an intuitive way for displaying daily weather information. The method reduces the cognitive burden on a user for displaying daily weather information, thereby creating a more efficient human-machine interface. For battery-operated computing devices, enabling a user to manage daily weather information faster and more efficiently conserves power and increases the time between battery charges.

The computer system (e.g., 600) displays (902), via the display generation component (e.g., 602), a weather user interface (e.g., 616) that corresponds to a first cumulative period of time (e.g., a 10-day period, a week) that includes a plurality of sub-periods of time (e.g., single days, 12-hour periods). In some embodiments, the weather user interface includes: a first user interface object (904) (e.g., a user interface object that represents a single day of a time period) that corresponds to a first sub-period of time of the plurality of sub-periods of time, wherein the first user interface object includes: a first cumulative time period (906) indication (e.g., 810, 814) (e.g., an indication that is based on the entire first cumulative time period) that indicates (e.g., represents, presents) a range (e.g., an amount of variation between a lower limit and an upper limit; a range between the minimum and maximum values of the weather value during the first cumulative period of time) of a weather value (e.g., temperature value, humidity value, precipitation value) over the first cumulative period of time; a first sub-period indication (908) (e.g., 820*a*, 820*b*, 820*c*) (e.g., a platter (e.g., a user interface object that represents a discreet time period (e.g., a day) within the period of time)) that represents a range of the weather value for the first sub-period of time (e.g., a range of the weather value that falls within (e.g., the minimum value for the first sub-period of time is equal to or greater than the minimum value of the range for the cumulative period of time and the maximum value for the first sub-period of time is equal to or less than the maximum value of the range for the cumulative period of time) the range of the weather value over the cumulative period of time); and a second user interface object (910) (e.g., a user interface object that represents a single day of a time period) that corresponds to a second sub-period of time of the plurality of sub-periods of time and that is different than the first sub-period of time, wherein the second user interface object includes: a second cumulative time period indication (912) (810, 814) (e.g., an indication that is based on the entire first cumulative time period) that indicates (e.g., represents, presents) the range of the weather value over the first cumulative period of time; and a second sub-period indication (914)(820*a*, 820*b*, 820*c*) (e.g., a platter) (e.g., a user interface object that represents a discreet time period (e.g., a second day) within the period of time) that represents a range (e.g., a range for the second discreet time period) of the weather value for the second sub-period of time. In some embodiments, the first and second cumulative time period indications have the same appearance and/or are the same. In some embodiments, other weather information platters (e.g., hourly forecast platters (e.g., 612), first type of platters (e.g., 640, 662), second types of platter (e.g., 612, 624, 618, 606, 614) (e.g., as discussed in relation to FIG. 6B) are displayed while the first and second user interface objects are displayed. In some embodiments, the first sub-period indication is displayed within (e.g., encompassed by) the first cumulative time period indication. In some embodiments, the appearance of the first sub-period indication contrasts with the appearance of the first cumulative time period indication (e.g., the first sub-period indication has a first color and the first cumulative time period indication has a second color that contrasts with the first color)). In some embodiments, the weather user interface concurrently includes the first cumulative time period indication, the first sub-period indication, the second user interface object, the second cumulative time period indication and the second sub-period indication. Displaying a first cumulative time period indication that indicates a range of a weather value over a first cumulative time period and a first sub-period indication that indicates a range for a first sub-period of time provides the user with visual feedback concerning how the range of the weather value for the first sub-period of time compares to the range of the weather values for the cumulative time period, which results in improved visual feedback. Displaying a first sub-period indication that represents a range of the weather value for a first sub-period of time and displaying a second sub-period indication that represents a range of the weather value for a second sub period of times provides a user with visual feedback concerning how the range of the weather value for each sub-period of time compare.

In some embodiments, the weather value is selected from the group consisting of: temperature (e.g., displayed in degrees (e.g., Fahrenheit, Celsius)), humidity, forecasted likelihood of precipitation (e.g., displayed as a percentage), amount of precipitation, and a combination thereof.

In some embodiments, the weather user interface (e.g., 616) includes a plurality of sub-period indications that includes the first sub-period indication (820*a*, 820*b*, 820*c*) and the second sub-period indication (820*a*, 820*b*, 820*c*), wherein each sub-period indication of the plurality of sub-period indications corresponds to a respective sub-period of time of the plurality of sub-periods of time (e.g., each sub-period of time in the plurality of sub-periods of time has a corresponding sub-period indication); the plurality of sub-period indications are displayed along (e.g., include portions of the indications that are arranged along the axis) a first axis (e.g., a horizontal axis; a vertical axis) of the weather user interface and, collectively, span a first range of the first axis that includes a first (e.g., 810a1, 810a2) terminus and a second terminus (e.g., 810a1, 810a2), wherein the first terminus is opposite the second terminus along the first range of the first axis; the range of the weather value for the first sub-period of time includes a minimum value (e.g., 830b) for the weather value over the first cumulative period of time (e.g., a minimum forecasted value for the weather value; the first sub-period of time includes the minimum forecasted temperature for the entire first cumulative period of time); the range of the weather value for the second sub-period of time includes a maximum value (e.g., 830a) for the weather value over the first cumulative period of time (e.g., a maximum forecasted value for the weather value; the first sub-period of time includes the maximum forecasted temperature for the entire first cumulative period of time); the first sub-period indication includes a first sub-period indication sub-element that indicates the minimum value of the weather value for the first sub-period of time and that is displayed at the first terminus of the first range of the first axis (e.g., the sub-element that indicates the minimum value of the weather value for the entire first cumulative period of time is displayed at one end of the axis along which the sub-period indications are displayed (e.g., is displayed at the left-most edge relative to all the sub-period indications)); and the second sub-period indication includes a second sub-period indication sub-element that indicates the maximum value of the weather value for the first sub-period of time and that is displayed at the second terminus of the first range of the first axis (e.g., the sub-element that indicates the maximum value of the weather value for the entire first cumulative period of time is displayed at the opposite end of the axis along which the sub-period indications displayed (e.g., is displayed at the right-most edge relative to all the sub-period indications)). In some embodiments, the weather user interface is configured to display the coldest day of the entire forecasted period (e.g., forecasted 10-day period) along a left edge and the warmest day of the entire forecasted period along a right edge, thereby providing users with an interface that makes readily apparent the coldest and warmest days in the entire forecasted period. Displaying a first sub-period indication sub-element that indicates a minimum value of a weather value at a first terminus of a first range of a first axis and displaying a second sub-period indication sub-element that indicates a maximum value of the weather value at a second terminus of the first range of the first axis provides the user with visual feedback regarding the range of the weather value over a period of time, which results in improved visual feedback. Displaying a first sub-period indication sub-element that indicates a minimum value of a weather value at a first terminus of a first range of a first axis and displaying a second sub-period indication sub-element that indicates a maximum value of the weather value at a second terminus of the first range of the first axis provides the user with visual feedback regarding the sub-period that corresponds to a minimum weather value and the sub-period that corresponds to a maximum weather value, which results in improved visual feedback.

In some embodiments, the first sub-period indication (e.g., 820a, 820b, 820c) is displayed as an inset of the first cumulative time period indication (e.g., 810, 814) and occupies a first sub-portion of the first cumulative time period indication (e.g., a first sub-portion that represents a range of the weather value for the first cumulative period of time that corresponds to the first sub-period of time), without occupying a second sub-portion of the first cumulative time period indication (e.g., a second sub-portion that represents a range of the weather value for the first cumulative period of time that does not correspond to the first sub-period of time). Displaying the first sub-period as an inset of the first cumulative time period provides the user with visual feedback regarding how a weather value range for a sub-period compares to a weather value for a cumulative time period, which provides improved visual feedback.

In some embodiments, the first sub-period indication (e.g., 810a, 810b, 810c) includes a first gradient of a visual characteristic (e.g., a gradient of color), with values of the visual characteristic in the first gradient representing values of the weather value in the range of the weather value for the first sub-period of time; the second sub-period indication (e.g., 810a, 810b, 810c) includes a second gradient of the visual characteristic (e.g., a gradient of color), with values of the visual characteristic in the second gradient representing values of the weather value in the range of the weather value for the second sub-period of time; like values of the visual characteristic in the first gradient and like values of the visual characteristic in the second gradient represent the same value of the weather value (e.g., the same color represents the same temperature across different sub-period indications). Including a first gradient of a visual characteristic where values of the visual characteristic represent values of a weather value provides the user with visual feedback regarding the various values for the weather value, which results in improved visual feedback. Including a first gradient of a visual characteristic with values representing a weather value and including a second gradient of a visual characteristic representing a weather value where like visual characteristics of the first gradient and the second gradient represent the same weather value provides visual feedback that allows a user to easily and efficiently compare and contrast weather values between a first sub-period and a second sub-period, which results in improved visual feedback.

In some embodiments, the first sub-period indication (e.g., 810a, 810b, 810c) has a first displayed width that is based on the range of the weather value for the first sub-period of time (e.g., the displayed width of the first sub-period indication varies based on the range of the weather value for the first sub-period of time (e.g., the width is wider for a greater range and narrower for a less range). Displaying a sub-period indication that has a width that is based on the range of a weather value for a first sub-period of time provides a user with visual feedback by allowing the user to easily and efficiently determine the difference between the maximum weather value and the minimum weather value for the first sub-period of time, which results in improved visual feedback.

In some embodiments, the first sub-period of time includes a current time period (e.g., a current time period at a current location associated with a current location of the computer system (e.g., the current time of day); the first sub-period of time represents the current day, which includes the current time) and the weather user interface (e.g., 616) further includes: a current weather value indicator (e.g., 802) that represents the current value of weather value at the current time period. In some embodiments, the current weather value indicator is displayed as an inset of the first sub-period indication (e.g., 810*a*, 810*b*, 810*c*) and represents the current weather value for the first sub-period of time within the range of the weather value for the first sub-period of time. Including a current weather value indicator in the weather user interface that represents the current value of a weather value provides a user with visual feedback regarding current weather conditions at a location, which results in improved visual feedback.

In some embodiments, displaying the weather user interface (e.g., 816) further includes: in accordance with a determination that one or more weather conditions (e.g., current weather conditions or weather conditions forecasted for the future) (e.g., rainstorm, snowstorm, weather air quality conditions) associated with a location (e.g., real world, physical location) (e.g., one or more weather conditions that are currently occurring at the location of the computer system) satisfies a first set of weather condition criteria (e.g., one or more weather conditions is a rainstorm, a snowstorm, a hailstorm, and/or weather air quality conditions) (e.g., current and/or forecasted weather conditions at a location are of a certain magnitude (e.g., heavy rain, heavy snow, dangerous air quality levels)), displaying the first user interface object 9(e.g., 810*a*, 810*b*, 810*c*) at a first location (e.g., first positon) (e.g., the position of daily range sub-bars 810*a*, 810*b*, 810*c* in FIG. 8B) in the weather user interface; and in accordance with a determination that the one or more weather conditions associated with the location satisfy a second set of weather condition criteria, displaying the first user interface object (e.g., 810*a*, 810*b*, 810*c*) at a second location (e.g., second positon) in the weather user interface. In some embodiments, both the first user interface object and the second user interface object are displayed. In some embodiments, the second set includes a criterion that is satisfied when the one or more weather conditions associated with the location do not satisfy the first set of weather condition criteria Automatically displaying a first user interface object at a first location when certain prescribed conditions are met (e.g., in accordance with a determination that one or more weather conditions associated with a location satisfies a first set of weather conditions) automatically provides the user with an indication regarding the weather conditions at a location, which performs an operation when a set of conditions has been met without requiring further user input.

In some embodiments, the computer system (e.g., 600) displays via the display generation component, a second weather user interface (e.g., 616) (e.g., a second iteration of the weather user interface that is displayed at a later point in time (e.g., one day later) that corresponds to a second cumulative period of time (e.g., a 10-day period, a week) that includes a second plurality of sub-periods of time (e.g., single days, 12-hour periods), wherein the second plurality of sub-periods of time includes the first sub-period of time that was included in the first cumulative period of time and includes a third sub-period of time that was not included in the first cumulative period of time (e.g., a sub-period of time that comes after the first cumulative time period). In some embodiments, the second weather user interface includes: a third user interface object that corresponds to the first sub-period of time and that is different from the first user interface object (e.g., while the first user interface object and the third user interface object both correspond to the same first sub-period of time (e.g., the same day), the first and third user interface objects are different), wherein the third user interface object includes: a third cumulative time period indication (e.g., 814) (e.g., an indication that is based on the entire second cumulative time period) that indicates (e.g., represents, presents) a range (e.g., an amount of variation between a lower limit and an upper limit; a range between the minimum and maximum values of the weather value during the first cumulative period of time) of the weather value (e.g., a forecasted weather value (e.g., temperature value, humidity value, precipitation value)) over the second cumulative period of time (e.g., the third cumulative time period indication is based on at least the range of weather values for the first and third sub-periods of time) and that is different from the first cumulative time period indication (e.g.,810); and a third sub-period indication (e.g., 820*b*) (e.g., a platter (e.g., a user interface object that represents a discreet time period (e.g., a day) within the period of time)) that represents a range of the weather value for the first sub-period of time. In some embodiments, the second weather user interface includes: a fourth user interface object that corresponds to the third sub-period of time of the second plurality of sub-periods of time, wherein the fourth user interface object includes: a fourth cumulative time period indication (e.g., 814) (e.g., an indication that is based on the entire second cumulative time period) that indicates (e.g., represents, presents) the range of the weather value over the second cumulative period of time; and a fourth sub-period indication (e.g., 820*d*) (e.g., a platter) (e.g., a user interface object that represents a discreet time period (e.g., a last day) within the second cumulative period of time) that represents a range (e.g., a range for the third sub-period of time) of the weather value for the third sub-period of time. In some embodiments, the third and fourth cumulative time period indications have the same appearance and/or are the same. In some embodiments, the second weather user interface concurrently includes the third user interface object, the third cumulative time period indication, the third sub-period indication, the fourth user interface object, the fourth cumulative time period indication, and the fourth sub-period indication. In some embodiments, the second weather user interface does not include a fourth sub-period of time that was included in the first cumulative period of time (e.g., an earliest day of the previous 10-day period).

In some embodiments, the weather user interface includes numerical representations (e.g., a set of numerical representation for each sub period of time) that correspond to a minimum weather value and a maximum weather value for a respective sub period of time. In some embodiments, the current weather value indicator is displayed as overlaid on top of a sub period indication.

Note that details of the processes described above with respect to method 900 (e.g., FIG. 9) are also applicable in an analogous manner to the methods described herein. For example, method 700 optionally includes one or more of the characteristics of the various methods described above with reference to method 900. For example, the location of daily range bars on the weather user interface may be dependent upon weather conditions as described above in relation to method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery weather information to a user. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted weather information that is of greater interest to the user. Accordingly, use of such personal information data enables users to have greater control of the delivered weather information. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to "opt in" or "opt out" of participation in the collection of personal information data during registration for services or anytime thereafter. In another example, users can select not to provide location data for targeted weather information delivery services. In yet another example, users can select to limit the length of time location data is maintained or collected or entirely prohibit the tracking of their location. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, weather information can be selected and delivered to users by inferring location based on non-personal information data or a bare minimum amount of personal information, such as the content being requested by the device associated with a user, other non-personal information available to the weather services, or publicly available information.

What is claimed is:

1. A computer system configured to communicate with a display generation component, the computer system comprising:
   one or more processors; and
   memory storing one or more programs configured to be executed by the one or more processors, the one or more programs including instructions for:
   displaying, via the display generation component, a weather user interface, wherein displaying the weather user interface includes:
   in accordance with a determination that one or more weather conditions associated with a location satisfies a first set of weather condition criteria, displaying a first user interface object of a first type wherein:
  in accordance with a determination that the one or more weather conditions associated with the location are of a first type of weather condition, the first user interface object of the first type is a first type of conditional platter; and
  in accordance with a determination that the one or more weather conditions associated with the location are of a second type of weather condition, the first user interface object of the first type is a second type of conditional platter, different from the first type of conditional platter, wherein the first type of the conditional platter includes information related to the first type of weather condition and the second type of conditional platter includes information related to the second type of weather condition;
  in accordance with a determination that the one or more weather conditions associated with the location do not satisfy the first set of weather condition criteria, forgo displaying the first user interface object; and
displaying a second user interface object and a third user interface object of a second type, wherein:
  in accordance with a determination that the one or more weather conditions associated with the location satisfy a second set of weather condition criteria, the second user interface object and the third user interface object are displayed in a first order; and
  in accordance with a determination that the one or more weather conditions associated with the location satisfy a third set of weather condition criteria, different from the second set of weather condition criteria, the second user interface object and the third user interface object are displayed in a second order, different from the first order.

2. The computer system of claim 1, wherein the second user interface object of the second type and the third user interface object of the second type are each independently selected from the group consisting of:
  an air quality platter that includes air quality information;
  an air quality map platter that includes a map and air quality information for at least one location on the map;
  a precipitation map platter that includes a second map and precipitation information for at least one location on the second map;
  a multi-day forecast platter that includes weather forecast information for a plurality of days; and
  an hourly forecast platter that includes weather forecast information for a plurality of hours.

3. The computer system of claim 1, wherein:
displaying the weather user interface includes:
  in accordance with a determination that a set of display position criteria are satisfied, the set of display position criteria including a criterion that is satisfied when the first user interface object of the first type is not to be displayed, displaying the second user interface object of the second type or the third user interface object of the second type at a first position in the weather user interface; and
  in accordance with a determination that the first user interface object of the first type is to be displayed: displaying the second user interface object and the third user interface object of the second type at positions in the weather user interface that are other than the first position.

4. The computer system of claim 3, the one or more programs further including instructions for:
displaying a fourth user interface object of the first type, wherein:
  in accordance with a determination that the first user interface object of the first type is not to be displayed, the fourth user interface object of the first type is displayed at the first position; and
  in accordance with a determination that the first user interface object of the first type is to be displayed, the first user interface object of the first type is displayed at the first position.

5. The computer system of claim 1, wherein the second user interface object of the second type includes a map of a first size, and wherein the computer system is in communication with one or more input devices, the one or more programs further including instructions for:
  while displaying the second user interface object, detecting, via the one or more input devices, a first input that corresponds to selection of the second user interface object of the second type;
  in response to detecting the first input, displaying the map at a second size, different from the first size.

6. The computer system of claim 5, wherein displaying the map at the second size includes displaying a scrubber control and a precipitation overlay, the one or more programs further including instructions for:
  while displaying the map at the second size, detecting, via the one or more input devices, a second input that corresponds to a request to activate the scrubber control; and
  in response to detecting the second input to activate the scrubber control, displaying an animation of the precipitation overlay transitioning across the map at the second size.

7. The computer system of claim 5, wherein while the map is at the second size, the map includes at least a first representation of a city of interest.

8. The computer system of claim 1, the one or more programs further including instructions for:
  while displaying the second user interface object and the third user interface object, displaying, via the display generation component:
    in accordance with a determination that the one or more weather conditions satisfy a third set of weather condition criteria, a first dynamic representation of a first weather condition; and
    in accordance with a determination that the one or more weather conditions satisfy a fourth set of weather condition criteria, a second dynamic representation, different from the first dynamic representation, of a second weather condition that is different from the first weather condition.

9. The computer system of claim 8, wherein displaying the first dynamic representation includes displaying a first animated interaction of the first dynamic representation with one or more of the first user interface object of the first type, the second user interface object of the second type, and the third user interface object of the second type, wherein the first animated interaction is based on the first weather condition.

10. The computer system of claim 9, wherein displaying the second dynamic representation includes displaying a second animated interaction of the first dynamic representation with one or more of the first user interface object of the first type, the second user interface object of the second type, and the third user interface object of the second type, wherein the second animated interaction is based on the second weather condition.

11. The computer system of claim 8, wherein the location corresponds to a physical location of the computer system.

12. The computer system of claim 8, wherein the first dynamic representation of the one or more weather conditions includes a representation of the sun, the one or more programs thither including instructions for:
   in accordance with a determination that the physical position of the sun at the location is a first solar position, displaying the representation of the sun at a second position in the weather user interface; and
   in accordance with a determination that the physical position of the sun at the location is a second solar position, displaying the representation of the sun at a third position in the weather user interface different from the second position.

13. The computer system of claim 8, wherein the first dynamic representation and/or the second dynamic representation have a first visual characteristic that varies based on a weather characteristic of the one or more weather conditions at the location.

14. The computer system of claim 1, wherein the first user interface object corresponds to a first weather event, and wherein the second user interface object corresponds to the first weather event.

15. A method, comprising:
   at a computer system that is in communication with a display generation component:
      displaying, via the display generation component, a weather user interface, wherein displaying the weather user interface includes:
         in accordance with a determination that one or more weather conditions associated with a location satisfies a first set of weather condition criteria, displaying a first user interface object of a first type wherein:
            in accordance with a determination that the one or more weather conditions associated with the location are of a first type of weather condition, the first user interface object of the first type is a first type of conditional platter; and
            in accordance with a determination that the one or more weather conditions associated with the location are of a second type of weather condition, the first user interface object of the first type is a second type of conditional platter, different from the first type of conditional platter, wherein the first type of the conditional platter includes information related to the first type of weather condition and the second type of conditional platter includes information related to the second type of weather condition;
         in accordance with a determination that the one or more weather conditions associated with the location do not satisfy the first set of weather condition criteria, forgo displaying the first user interface object; and
         displaying a second user interface object and a third user interface object of a second type, wherein:
            in accordance with a determination that the one or more weather conditions associated with the location satisfy a second set of weather condition criteria, the second user interface object and the third user interface object are displayed in a first order; and
            in accordance with a determination that the one or more weather conditions associated with the location satisfy a third set of weather condition criteria, different from the second set of weather condition criteria, the second user interface object and the third user interface object are displayed in a second order, different from the first order.

16. The method of claim 15, wherein the second user interface object of the second type and the third user interface object of the second type are each independently selected from the group consisting of:
   an air quality platter that includes air quality information;
   an air quality map platter that includes a map and air quality information for at least one location on the map;
   a precipitation map platter that includes a second map and precipitation information for at least one location on the second map;
   a multi-day forecast platter that includes weather forecast information for a plurality of days; and
   an hourly forecast platter that includes weather forecast information for a plurality of hours.

17. The method of claim 15, wherein:
   displaying the weather user interface includes:
      in accordance with a determination that a set of display position criteria are satisfied, the set of display position criteria including a criterion that is satisfied when the first user interface object of the first type is not to be displayed, displaying the second user interface object of the second type or the third user interface object of the second type at a first position in the weather user interface; and
      in accordance with a determination that the first user interface object of the first type is to be displayed:
         displaying the second user interface object and the third user interface object of the second type at positions in the weather user interface that are other than the first position.

18. The method of claim 17, further comprising:
   displaying a fourth user interface object of the first type, wherein:
      in accordance with a determination that the first user interface object of the first type is not to be displayed, the fourth user interface object of the first type is displayed at the first position; and
      in accordance with a determination that the first user interface object of the first type is to be displayed, the first user interface object of the first type is displayed at the first position.

19. The method of claim 15, wherein the second user interface object of the second type includes a map of a first size, and wherein the computer system is in communication with one or more input devices, the method further comprising:
   while displaying the second user interface object, detecting, via the one or more input devices, a first input that corresponds to selection of the second user interface object of the second type;
   in response to detecting the first input, displaying the map at a second size, different from the first size.

20. The method of claim 19, wherein displaying the map at the second size includes displaying a scrubber control and a precipitation overlay, the method further comprising:

while displaying the map at the second size, detecting, via the one or more input devices, a second input that corresponds to a request to activate the scrubber control; and in response to detecting the second input to activate the scrubber control, displaying an animation of the precipitation overlay transitioning across the map at the second size.

21. The method of claim 19, wherein while the map is at the second size, the map includes at least a first representation of a city of interest.

22. The method of claim 15, further comprising:
while displaying the second user interface object and the third user interface object, displaying, via the display generation component:
in accordance with a determination that the one or more weather conditions satisfy a third set of weather condition criteria, a first dynamic representation of a first weather condition; and
in accordance with a determination that the one or more weather conditions satisfy a fourth set of weather condition criteria, a second dynamic representation, different from the first dynamic representation, of a second weather condition that is different from the first weather condition.

23. The method of claim 22, wherein displaying the first dynamic representation includes displaying a first animated interaction of the first dynamic representation with one or more of the first user interface object of the first type, the second user interface object of the second type, and the third user interface object of the second type, wherein the first animated interaction is based on the first weather condition.

24. The method of claim 23, wherein displaying the second dynamic representation includes displaying a second animated interaction of the first dynamic representation with one or more of the first user interface object of the first type, the second user interface object of the second type, and the third user interface object of the second type, wherein the second animated interaction is based on the second weather condition.

25. The method of claim 22, wherein the location corresponds to a physical location of the computer system.

26. The method of claim 22, wherein the first dynamic representation of the one or more weather conditions includes a representation of the sun, the method further comprising:
in accordance with a determination that the physical position of the sun at the location is a first solar position, displaying the representation of the sun at a second position in the weather user interface; and
in accordance with a determination that the physical position of the sun at the location is a second solar position, displaying the representation of the sun at a third position in the weather user interface different from the second position.

27. The method of claim 22, wherein the first dynamic representation and/or the second dynamic representation have a first visual characteristic that varies based on a weather characteristic of the one or more weather conditions at the location.

28. The method of claim 15, wherein the first user interface object corresponds to a first weather event, and wherein the second user interface object corresponds to the first weather event.

29. A non-transitory computer-readable storage medium storing one or more programs configured to be executed by one or more processors of a computer system that is in communication with a display generation component, the one or more programs including instructions for:
displaying, via the display generation component, a weather user interface, wherein displaying the weather user interface includes:
in accordance with a determination that one or more weather conditions associated with a location satisfies a first set of weather condition criteria, displaying a first user interface object of a first type wherein:
in accordance with a determination that the one or more weather conditions associated with the location are of a first type of weather condition, the first user interface object of the first type is a first type of conditional platter; and
in accordance with a determination that the one or more weather conditions associated with the location are of a second type of weather condition, the first user interface object of the first type is a second type of conditional platter, different from the first type of conditional platter, wherein the first type of the conditional platter includes information related to the first type of weather condition and the second type of conditional platter includes information related to the second type of weather condition;
in accordance with a determination that the one or more weather conditions associated with the location do not satisfy the first set of weather condition criteria, forgo displaying the first user interface object; and
displaying a second user interface object and a third user interface object of a second type, wherein:
in accordance with a determination that the one or more weather conditions associated with the location satisfy a second set of weather condition criteria, the second user interface object and the third user interface object are displayed in a first order; and
in accordance with a determination that the one or more weather conditions associated with the location satisfy a third set of weather condition criteria, different from the second set of weather condition criteria, the second user interface object and the third user interface object are displayed in a second order, different from the first order.

30. The non-transitory computer-readable storage medium of claim 29, wherein:
displaying the weather user interface includes:
in accordance with a determination that a set of display position criteria are satisfied, the set of display position criteria including a criterion that is satisfied when the first user interface object of the first type is not to be displayed, displaying the second user interface object of the second type or the third user interface object of the second type at a first position in the weather user interface; and
in accordance with a determination that the first user interface object of the first type is to be displayed:
displaying the second user interface object and the third user interface object of the second type at positions in the weather user interface that are other than the first position.

31. The non-transitory computer-readable storage medium of claim 30, the one or more programs further including instructions for:
displaying a fourth user interface object of the first type, wherein:

in accordance with a determination that the first user interface object of the first type is not to be displayed, the fourth user interface object of the first type is displayed at the first position; and in accordance with a determination that the first user interface object of the first type is to be displayed, the first user interface object of the first type is displayed at the first position.

32. The non-transitory computer-readable storage medium of claim 29, wherein the second user interface object of the second type includes a map of a first size, and wherein the computer system is in communication with one or more input devices, the one or more programs further including instructions for:

while displaying the second user interface object, detecting, via the one or more input devices, a first input that corresponds to selection of the second user interface object of the second type;

in response to detecting the first input, displaying the map at a second size, different from the first size.

33. The non-transitory computer-readable storage medium of claim 32, wherein displaying the map at the second size includes displaying a scrubber control and a precipitation overlay, the one or more programs further including instructions for:

while displaying the map at the second size, detecting, via the one or more input devices, a second input that corresponds to a request to activate the scrubber control; and in response to detecting the second input to activate the scrubber control, displaying an animation of the precipitation overlay transitioning across the map at the second size.

34. The non-transitory computer-readable storage medium of claim 32, wherein while the map is at the second size, the map includes at least a first representation of a city of interest.

35. The non-transitory computer-readable storage medium of claim 29, the one or more programs further including instructions for:

while displaying the second user interface object and the third user interface object, displaying, via the display generation component:

in accordance with a determination that the one or more weather conditions satisfy a third set of weather condition criteria, a first dynamic representation of a first weather condition; and in accordance with a determination that the one or more weather conditions satisfy a fourth set of weather condition criteria, a second dynamic representation, different from the first dynamic representation, of a second weather condition that is different from the first weather condition.

36. The non-transitory computer-readable storage medium of claim 35, wherein displaying the first dynamic representation includes displaying a first animated interaction of the first dynamic representation with one or more of the first user interface object of the first type, the second user interface object of the second type, and the third user interface object of the second type, wherein the first animated interaction is based on the first weather condition.

37. The non-transitory computer-readable storage medium of claim 36, wherein displaying the second dynamic representation includes displaying a second animated interaction of the first dynamic representation with one or more of the first user interface object of the first type, the second user interface object of the second type, and the third user interface object of the second type, wherein the second animated interaction is based on the second weather condition.

38. The non-transitory computer-readable storage medium of claim 35, wherein the location corresponds to a physical location of the computer system.

39. The non-transitory computer-readable storage medium of claim 35, wherein the first dynamic representation of the one or more weather conditions includes a representation of the sun, the one or more programs further including instructions for:

in accordance with a determination that the physical position of the sun at the location is a first solar position, displaying the representation of the sun at a second position in the weather user interface; and in accordance with a determination that the physical position of the sun at the location is a second solar position, displaying the representation of the sun at a third position in the weather user interface different from the second position.

40. The non-transitory computer-readable storage medium of claim 35, wherein the first dynamic representation and/or the second dynamic representation have a first visual characteristic that varies based on a weather characteristic of the one or more weather conditions at the location.

41. The non-transitory computer-readable storage medium of claim 29, wherein the first user interface object corresponds to a first weather event, and wherein the second user interface object corresponds to the first weather event.

42. The non-transitory computer-readable storage medium of claim 29, wherein the second user interface object of the second type and the third user interface object of the second type are each independently selected from the group consisting of:

an air quality platter that includes air quality information;

an air quality map platter that includes a map and air quality information for at least one location on the map;

a precipitation map platter that includes a second map and precipitation information for at least one location on the second map;

a multi-day forecast platter that includes weather forecast information for a plurality of days; and an hourly forecast platter that includes weather forecast information for a plurality of hours.

\* \* \* \* \*

UNITED STATES PATENT AND TRADEMARK OFFICE
CERTIFICATE OF CORRECTION

PATENT NO. : 11,630,559 B2  
APPLICATION NO. : 17/476286  
DATED : April 18, 2023  
INVENTOR(S) : Caroline J. Crandall et al.

Page 1 of 1

It is certified that error appears in the above-identified patent and that said Letters Patent is hereby corrected as shown below:

In the Claims

Column 57, Line 3, Claim 1, delete "type" and add -- type, --.

Column 59, Line 12, Claim 12, delete "thither" and add -- further --.

Column 59, Line 41, Claim 15, delete "type" and add -- type, --.

Column 62, Line 9, Claim 29, delete "type" and add -- type, --.

Signed and Sealed this  
Twenty-first Day of January, 2025

Coke Morgan Stewart  
*Acting Director of the United States Patent and Trademark Office*